(12) United States Patent
Sun

(10) Patent No.: US 12,244,539 B2
(45) Date of Patent: Mar. 4, 2025

(54) SPECTRUM MANAGEMENT DEVICE, ELECTRONIC DEVICE, WIRELESS COMMUNICATION METHOD TO ADJUST USAGE OF SPECTRUM TO PREVENT INTERFERENCE, AND STORAGE MEDIUM

(71) Applicant: Sony Group Corporation, Tokyo (JP)

(72) Inventor: Chen Sun, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 322 days.

(21) Appl. No.: 17/772,150

(22) PCT Filed: Dec. 4, 2020

(86) PCT No.: PCT/CN2020/133790
§ 371 (c)(1),
(2) Date: Apr. 27, 2022

(87) PCT Pub. No.: WO2021/115201
PCT Pub. Date: Jun. 17, 2021

(65) Prior Publication Data
US 2022/0376877 A1 Nov. 24, 2022

(30) Foreign Application Priority Data
Dec. 11, 2019 (CN) .......................... 201911267606.0

(51) Int. Cl.
*H04L 5/00* (2006.01)
*H04W 16/10* (2009.01)
(Continued)

(52) U.S. Cl.
CPC .......... *H04L 5/0073* (2013.01); *H04W 16/10* (2013.01); *H04W 28/0236* (2013.01); *H04W 72/0453* (2013.01); *H04W 72/541* (2023.01)

(58) Field of Classification Search
CPC ... H04L 5/0073; H04L 5/0032; H04L 5/1469; H04W 72/541; H04W 16/10;
(Continued)

(56) References Cited

U.S. PATENT DOCUMENTS

2010/0124181 A1* 5/2010 Hosein ............... H04W 72/541
370/344
2016/0088636 A1 3/2016 Zhao et al.
(Continued)

FOREIGN PATENT DOCUMENTS

| CN | 102158970 A | 8/2011 |
|---|---|---|
| CN | 107371165 A | 11/2017 |
| CN | 109041066 A | 12/2018 |

OTHER PUBLICATIONS

International Search Report and Written Opinion mailed on Mar. 2, 2021, received for PCT Application PCT/CN2020/133790, Filed on Dec. 4, 2020, 9 pages including English Translation.

*Primary Examiner* — Mewale A Ambaye
(74) *Attorney, Agent, or Firm* — XSENSUS LLP

(57) ABSTRACT

A spectrum management device includes a processing circuit configured to: coordinate, according to a predetermined interference coordination principle, interference between one or more base station devices of a communication system to be added and one or more base station devices of an existing communication system managed by the spectrum management device; determine, according to an interference coordination result, coordinated system performance of the communication system to be added; and send the coordinated system performance of the communication system to be added to the electronic device that manages the communication system to be added, so that the electronic device determines whether to allow the spectrum management device to perform spectrum management on the communication system to be added.

20 Claims, 13 Drawing Sheets

(51) Int. Cl.
*H04W 28/02* (2009.01)
*H04W 72/0453* (2023.01)
*H04W 72/541* (2023.01)

(58) Field of Classification Search
CPC ......... H04W 28/0236; H04W 72/0453; H04W 16/14; H04W 72/04; H04W 16/28
See application file for complete search history.

(56) References Cited

U.S. PATENT DOCUMENTS

| 2019/0364449 | A1* | 11/2019 | Yang | H04W 72/04 |
| 2021/0037414 | A1* | 2/2021 | Ryu | H04B 7/0617 |
| 2021/0045093 | A1* | 2/2021 | Rao | H04W 76/14 |
| 2022/0046453 | A1* | 2/2022 | Lee | H04W 76/27 |

* cited by examiner

SPECTRUM MANAGEMENT DEVICE, ELECTRONIC DEVICE, WIRELESS COMMUNICATION METHOD TO ADJUST USAGE OF SPECTRUM TO PREVENT INTERFERENCE, AND STORAGE MEDIUM

CROSS-REFERENCE TO RELATED APPLICATIONS

This application is based on PCT/CN2020/133790 filed on Dec. 4, 2020 which claims priority to Chinese Patent Application No. 201911267606.0, titled "SPECTRUM MANAGEMENT DEVICE, ELECTRONIC DEVICE, WIRELESS COMMUNICATION METHOD, AND STORAGE MEDIUM", filed on Dec. 11, 2019 with the China National Intellectual Property Administration, each of which are incorporated herein by reference in its entirety.

FIELD

Embodiments of the present disclosure generally relate to the field of wireless communication, and in particular to a spectrum management device, an electronic device, a wireless communication method and a storage medium. More particularly, the present disclosure relates to a spectrum management device in a wireless communication system, an electronic device serving as a network side device in a wireless communication system, a wireless communication method performed by a spectrum management device in a wireless communication system, a wireless communication method performed by a network side device in a wireless communication system, and a computer-readable storage medium.

BACKGROUND

With the development of wireless communication systems, users have increasingly high demands for services having high quality, high speed and new services. Operators and device manufacturers are required to continually improve the system to meet user demands. Therefore, a large amount of spectrum resources are required. However, spectrum resources are limited and are allocated to fixed operators and services, and a new available spectrum is quite scarce and expensive. In this case, a concept of dynamic frequency spectrum usage is proposed, that is, frequency resources which have been allocated to certain services but are not utilized sufficiently are utilized dynamically. A primary system may refer to a system having right to use a spectrum, and a secondary system may refer to a system that has no right to use a spectrum and only properly uses a spectrum allocated to the primary system when the primary system does not use the spectrum. In addition, the primary system and the secondary system may both have right to use a spectrum, but with different priorities in using the spectrum.

A spectrum management device may adjust usage of spectrum for the secondary system within an available range of spectrum resources in order to prevent interference between the secondary systems. Service of the spectrum management device is not mandatory and usually requires payment for use. Therefore, when a new communication system is expected to be deployed within a service range of the spectrum management device, the new communication system may purchase the service of the spectrum management device to obtain spectrum management by the spectrum management device, or the new communication system may not purchase the service of the spectrum management device. In a case where the new communication system uses the service of the spectrum management device, since spectrum management is required to be performed by the spectrum management device on the new communication system, a system performance of the new communication system may change, and the addition of the new communication system may affect the system performance of an existing communication system managed by the spectrum management device.

Therefore, it is necessary to propose a technical solution by which it may be reasonably determined whether a new communication system should use management service of a spectrum management device, in order to obtain an optimal solution while ensuring that a system performance of an existing communication system is not greatly affected.

SUMMARY

A general summary of the present disclosure is provided in this section, which is not a comprehensive disclosure of a full scope or all features thereof.

An objective of the present disclosure is to provide a spectrum management device, an electronic device, a wireless communication method, and a storage medium, in order to reasonably determine whether a new communication system should use a management service of a spectrum management device, so as to obtain an optimal solution while ensuring that a system performance of an existing communication system is not greatly affected.

According to an aspect of the present disclosure, a spectrum management device is provided, including processing circuitry processing circuitry configured to: perform, according to a predetermined interference coordination principle, coordination on interference between one or more base station devices in a to-be-added communication system and one or more base station devices in an existing communication system managed by the spectrum management device; determine, based on a result of interference coordination, a coordinated system performance of the to-be-added communication system; and transmit the coordinated system performance of the to-be-added communication system to an electronic device which manages the to-be-added communication system, for the electronic device to determine whether to agree to perform, by the spectrum management device, spectrum management on the to-be-added communication system.

According to another aspect of the present disclosure, an electronic device is provided, including processing circuitry configured to: determine a coordinated system performance of a to-be-added communication system managed by the electronic device in a case where interference coordination is performed by a spectrum management device; and determine, based on the coordinated system performance, whether to agree to perform, by the spectrum management device, spectrum management on the to-be-added communication system. The interference coordination comprises: performing, according to a predetermined interference coordination principle, coordination on interference between one or more base station devices in the to-be-added communication system and one or more base station devices in an existing communication system managed by the spectrum management device.

According to another aspect of the present disclosure, a wireless communication method performed by a spectrum management device a is provided, including: performing, according to a predetermined interference coordination principle, coordination on interference between one or more base station devices in a to-be-added communication system and one or more base station devices in an existing communication system managed by the spectrum management device; determining, based on a result of interference coordination, a coordinated system performance of the to-be-added communication system, and transmitting the coordinated system performance of the to-be-added communication system to an electronic device which manages the to-be-added communication system, for the electronic device to determine whether to agree to perform, by the spectrum management device, spectrum management on the to-be-added communication system.

According to another aspect of the present disclosure, a wireless communication method performed by an electronic device is provided, including: determining a coordinated system performance of a to-be-added communication system managed by the electronic device in a case where interference coordination is performed by a spectrum management device; and determining, based on the coordinated system performance, whether to agree to perform, by the spectrum management device, spectrum management on the to-be-added communication system. The interference coordination comprises: performing, according to a predetermined interference coordination principle, coordination on interference between one or more base station devices in the to-be-added communication system and one or more base station devices in an existing communication system managed by the spectrum management device.

According to another aspect of the present disclosure, a computer-readable storage medium including executable computer instructions is provided. The executable computer instructions, when executed by a computer, cause the computer to perform the wireless communication method according to the present disclosure.

With the spectrum management device, the electronic device, the wireless communication method, and the computer readable storage medium provided in the present disclosure, interference between one or more base station devices in a to-be-added communication system and one or more base station devices in an existing communication system may be coordinated, and a system performance of the to-be-added communication system may be determined based on a result of interference coordination, and thereby whether to use a service of the spectrum management device may be determined based on the system performance of the to-be-added communication system. In this way, an optimal solution may be determined based on the system performance of the to-be-added communication system.

Further areas of applicability will become apparent from the description provided herein. The description and specific examples in this section are illustrative only and are not intended to limit the scope of the present disclosure.

BRIEF DESCRIPTION OF THE DRAWINGS

The drawings described herein are only for illustrative purposes of selected embodiments rather than all possible implementations, and are not intended to limit the scope of the present disclosure. In the drawings.

Figure 1:
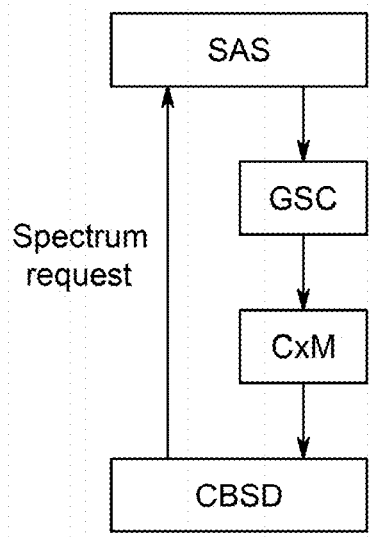
FIG. 1 is a schematic diagram showing architecture of a wireless communication system according to an embodiment of the present disclosure.

Although the present disclosure is susceptible to various modifications and alternative forms, specific embodiments thereof have been shown in the drawings as examples and are described in detail herein. However, it should be understood that the description of specific embodiments herein is not intended to limit the present disclosure to the disclosed specific forms; on the contrary, the purpose of the present disclosure is to cover all modifications, equivalents and replacements that fall within the spirit and scope of the present disclosure. It should be noted that throughout the several drawings, corresponding reference numerals indicate corresponding parts.

DETAILED DESCRIPTION

Examples of the present disclosure are described more adequately with reference to the drawings. The following description is merely exemplary, and is not intended to limit the present disclosure, application, or use.

Example embodiments are provided so that the present disclosure will be thorough and fully convey the scope to those skilled in the art. Numerous specific details such as examples of specific components, devices, and methods are set forth to provide a thorough understanding of the embodiments of the present disclosure. It will be apparent to those skilled in the art that the example embodiments may be implemented in many different forms without using specific details, none of which should be construed as limiting the scope of the present disclosure. In some example embodiments, well-known processes, well-known structures, and well-known technologies are not described in detail.

The description are made in the following order:
1. Description of a wireless communication system;
2. Exemplary configuration of a spectrum management device;
3. Exemplary configuration of an electronic device;
4. Method embodiments:
5. Application examples.

1. Description of a Wireless Communication System

FIG. 1 is a schematic diagram showing architecture of a wireless communication system according to an embodiment of the present disclosure. As shown in FIG. 1, the wireless communication system includes a Spectrum Access System (SAS), a General Authorized Access (GAA) Spectrum Coordination (GSC), a Coexistence Manager (CxM), and a Citizens Broadband Radio Service Devices (CBSD). When requiring a spectrum resource, the CBSD transmits a spectrum usage request to the SAS. The SAS determines an available spectrum range for a secondary system based on a spectrum usage of a primary system, and transmits calculated available spectrum to GSC. Then the GSC perform coordination on spectrums among multiple CxMs based on the available spectrum resources from the SAS, and transmits the spectrum resources allocated for the CxMs to the CxMs respectively. Next, each of the CxMs adjusts the spectrum usage of the secondary system within the range of available spectrum resources from GSC, thereby a spectrum resource is allocated to the CBSD. FIG. 1 shows a situation where the wireless communication system includes both the GSC and the CxM. In actual scenarios, some wireless communication systems may not include the GSC or the CxM. In addition, the GSC device may be integrated in the SAS, or may be a device independent of the SAS.

The wireless communication system according to the present disclosure may be a 5G NR (new radio) communication system.

The spectrum management device according to the present disclosure may be a GSC device, or a CxM, or may be a SAS integrated with a GSC device.

The SAS according to the present disclosure may determine the available spectrum range for the secondary system based on the spectrum usage of the primary system, a position of the primary system, a position of the secondary system, and other information. The SAS may be a spectrum management device determined based on a geographic location. The SAS may manage secondary systems within a certain region. For example, the SAS may be a spectrum allocation functional module provided by a geographic location database operator authorized according to national regulations.

The GSC device according to the present disclosure may be configured to perform coordination on spectrums managed by multiple CxMs based on the available spectrum resources from the SAS, to avoid interference between the spectrums managed by different CxMs.

The CxM according to the present disclosure may adjust the spectrum usage of the secondary system within the range of available spectrum resources from GSC. Here, the CxM may be a spectrum management device determined based on a geographic location. The CxM may manage secondary systems within a certain region. Further, the secondary systems managed by the CxM may be divided into different communication systems according to operators to which the secondary systems belong. For example, the CxM may manage two communication systems, where secondary systems in a first communication system belong to operator A, and secondary systems in a second communication system belong to operator B. Further, the secondary systems in each communication system may be managed by one electronic device, and the electronic device may be integrated in a network-side device of a certain secondary system in the communication system.

The secondary system according to the present disclosure may be a CBSD. The CBSD may include a network-side device, such as an eNB, a gNB (which is a base station in a 5th generation communication system), or any other type of base station device.

In the present disclosure, the communication system that has purchased service of the spectrum management device may be referred to as an existing communication system. The existing communication system may include one or more communication systems, and each of the communication systems belongs to an operator and is managed by an electronic device. The electronic device may be integrated in a network-side device of a certain secondary system in the communication system, or may be an independent device. Further, each existing communication system may include one or more base station devices. The communication system that has not yet purchased but is willing to purchase the service of spectrum management device may be referred to as a to-be-added communication system. The to-be-added communication system may belong to another operator and be managed by an electronic device integrated in a network-side device of a certain secondary system in the to-be-added communication system, or may be an independent device. Further, the to-be-added communication system may include one or more base station devices. In addition, in the present disclosure, in a case where the existing communication system or the to-be-added communication system includes only one base station device, the electronic device that manages the communication system may be the base station device.

According to the embodiments of the present disclosure, the spectrum management equipment may perform coordination on interference between the base station devices in the to-be-added communication system and the base station devices in the existing communication system, determine a system performance of the to-be-added communication system based on a result of interference coordination. The electronic device that manages the to-be-added communication system may determine whether to use the service of the spectrum management device based on the system performance of the to-be-added communication system. In this way, an optimal solution may be determined based on the system performance of the to-be-added communication system.

2. Exemplary Configuration of a Spectrum Management Device

Figure 2:
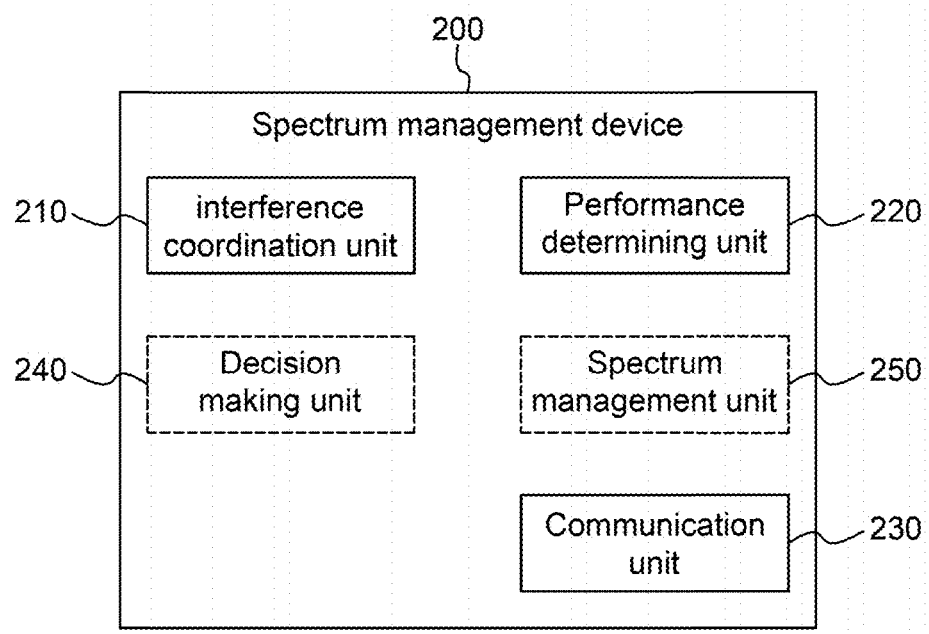
FIG. 2 is a block diagram showing an example of a configuration of a spectrum management device according to an embodiment of the present disclosure.

FIG. 2 is a block diagram showing an example of a configuration of a spectrum management device 200 according to an embodiment of the present disclosure. The spectrum management device 200 here may be a GSC device or a CxM, or may be an SAS integrated with GSC functions. The spectrum management device 200 may perform spectrum management on one or more existing communication systems. In particular, the one or more existing communication systems may belong to one or more operator, respectively.

As shown in FIG. 2, the spectrum management device 200 may include an interference coordination unit 210, a performance determining unit 220, and a communication unit 230.

Here, units of the spectrum management device 200 may be included in a processing circuit. It should be noted that the spectrum management device 200 may include one processing circuit or multiple processing circuits. Further, the processing circuit may include various discrete functional units for performing various different functions and/or operations. It should be noted that these functional units may be physical entities or logical entities, and units with different titles may be implemented by a same physical entity.

According to an embodiment of the present disclosure, the interference coordination unit 210 may be configured to perform, according to a predetermined interference coordination principle, coordination on interference between one or more base station devices in a to-be-added communication system and one or more base station devices in an existing communication system managed by the spectrum management device 200.

According to an embodiment of the present disclosure, the performance determining unit 220 may be configured to calculate a system performance of the to-be-added communication system and/or the existing communication system. For example, the performance determining unit 220 may determine a first system performance of the to-be-added communication system based on a result of interference coordination. The first system performance indicates the system performance of the to-be-added communication system in a case where spectrum management is performed by the spectrum management device 200 on the to-be-added communication system. Here, the spectrum management performed by the spectrum management device 200 includes the aforementioned interference coordination, and therefore the first system performance is also referred to as a coordinated system performance of the to-be-added communication system herein.

According to an embodiment of the present disclosure, the spectrum management device 200 may transmit, through the communication unit 230, the first system performance of the to-be-added communication system to an electronic device which manages the to-be-added communication system, for the electronic device to determine whether to agree to perform, by the spectrum management device 200, spectrum management on the to-be-added communication system.

As can be seen, according to the embodiments of the present disclosure, the spectrum management device 200 may perform coordination on interference between one or more base station devices in the to-be-added communication system and one or more base station devices in the existing communication system; and determine, based on a result of interference coordination, a system performance of the to-be-added communication system. The electronic device that manages the to-be-added communication system may determine, based on the system performance of the to-be-added communication system, whether to use the service of the spectrum management device. In this way, an optimal solution may be determined based on the system performance of the to-be-added communication system.

According to an embodiment of the present disclosure, the spectrum management device 200 may receive, from the electronic device and through the communication unit 230, information of the one or more base station devices in the to-be-added communication system.

According to an embodiment of the present disclosure, the information of the one or more base station devices in the to-be-added communication system may include: the number of base station devices in the to-be-added communication system, uplink and downlink configuration of sub-frames of each of the base station devices, and a maximum transmission power of each of the base station devices. Here, the uplink and downlink configuration of a sub-frame refers to an uplink-downlink configuration mode for TDD. Each mode specifies whether to transmit uplink data or downlink data in one of different sub-frames, time slots or OFDM symbols. For example, a total of 7 modes are supported in a TDD-LTE system, in which mode 0 means that the 10 sub-frames are downlink sub-frame, special sub-frame, uplink sub-frame, uplink sub-frame, uplink sub-frame, downlink sub-frame, special sub-frame, uplink sub-frame, uplink sub-frame, and uplink sub-frame. In an NR system, more modes are supported as symbol-level uplink and downlink transmission is supported.

According to an embodiment of the present disclosure, the information of the one or more base station devices in the to-be-added communication system may further include position distribution information of the one or more base station devices in the to-be-added communication system. Here, the position distribution information indicates a process of distributing positions of the base station devices in the to-be-added communication system. The distribution process includes but is not limited to a Poisson point process.

According to an embodiment of the present disclosure, the interference coordination unit 210 may simulate, based on the information of the base station devices in the to-be-added communication system, a position distribution of the one or more base station devices in the to-be-added communication system.

According to an embodiment of the present disclosure, in a case where the information of the base station devices in the to-be-added communication system includes only the number of base station devices, the uplink and downlink configuration of sub-frames of each of the base station devices, and the maximum transmission power of each of the base station devices, except the position distribution information of the base station devices, the interference coordination unit 210 may simulate the position distribution of the base station devices in the to-be-added communication system by randomly placing the base station devices in the to-be-added communication system. That is to say, a base station device in the to-be-added communication system has identical probabilities to appear at any of positions within a service range of the spectrum management device 200.

According to an embodiment of the present disclosure, in a case where the information of the base station devices in the to-be-added communication system includes position distribution information of the base station devices, the interference coordination unit 210 may simulate a position distribution of the base station devices in the to-be-added communication system based on the position distribution information. For example, in a case where positions of the base station devices in the to-be-added communication system obeys the Poisson point process, the interference coordination unit 210 may place the base station devices in the to-be-added communication system to realize a position distribution conforming to the Poisson point process.

Figure 3:
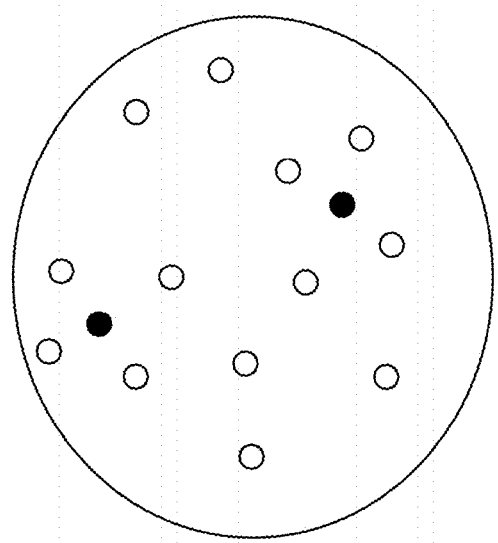
FIG. 3 is a schematic diagram showing a simulated position distribution of base station devices according to an embodiment of the present disclosure.

FIG. 3 is a schematic diagram showing a simulated position distribution of base station devices according to an embodiment of the present disclosure. In FIG. 3, an outer circle represents a service range of the spectrum management device 200; and each inner circle represents a position of a base station device, in which a hollow circle represents the position of the base station device in an existing communication system managed by the spectrum management device 200, and a solid circle represents the position of the base station device in a to-be-added communication system simulated by the interference coordination unit 210. Here, only two base station devices in the to-be-added communication system are shown for ease of description, and in practice, the number of base station devices in the to-be-added communication system is not limited thereto.

According to an embodiment of the present disclosure, the interference coordination unit 210 may perform interference coordination based on the simulated position distribution. Further, the interference coordination unit 210 may perform, according to a predetermined interference coordination principle, interference coordination based on the positions of the base station devices in the existing communication system and the simulated positions of the base station devices in the to-be-added communication system. Further, the interference coordination unit 210 may perform interference coordination based on the uplink and downlink configuration of sub-frames of the base station devices in the existing communication system and the maximum transmission power of each of the base station devices in the existing communication system, and the uplink and downlink configuration of sub-frames of the base station devices in the to-be-added communication system and the maximum transmission power of each of the base station devices in the to-be-added communication system.

According to an embodiments of the present disclosure, the predetermined interference coordination principle may include: adjusting, with respect to a base station device in the existing communication system which generates interference to any of the base station devices in the to-be-added communication system, uplink and downlink configuration of sub-frames of the base station device to reduce interference, or prohibiting the base station device from performing uplink and downlink transmissions.

According to an embodiment of the present disclosure, the base station devices may adopt different modes of uplink and downlink configuration, and therefore in a case where two close base station devices A and B adopt different modes of uplink and downlink configuration, a situation in which base station device A is receiving data from user device C (uplink transmission) and, at a same time, base station device B is transmitting data to user device D (downlink transmission), may occur. In this case, a signal from base station device B may reach base station device A and cause interference to base station device A, or a signal from user device C may reach user device D and cause interference to user device D. In other words, interference may occur when two base station devices positioned close adopt different modes of uplink and downlink configuration. For example, the existing communication system managed by the spectrum management device 200 is a camera network whose main business is to upload data, and thus the base station devices in the communication system has more uplink sub-frames or symbols in the uplink and downlink configuration; and the to-be-added communication system is an entertainment network with downlink VR content transmission as main business, and thus the base station device in the to-be-added communication system has more downlink sub-frames or symbols in the uplink and downlink configuration. In this case, it is easy to cause interference between the base station devices in the two communication systems.

According to an embodiment of the present disclosure, it is possible to determine whether there is interference between base station devices a and b based on strength of a signal from base station device a to base station device b and the uplink and downlink configurations used by base station device a and base station device b. Further, in a case where the strength of the signal from base station device a to base station device b is relatively strong and the uplink and downlink configurations used by base station device a and base station device b are different, it may be determined that base station device a interferes with base station device b. Further, the strength of the signal from base station device a to base station device b may be determined based on a distance between base station devices a and b and a maximum transmission power of base station device a using any well-known method in the art, which is not limited herein.

According to an embodiment of the present disclosure, with respect to a base station device in the existing communication system which generates interference to any of the base station devices in the to-be-added communication system, the uplink and downlink configuration of sub-frames of the base station device may be adjusted. For example, the uplink and downlink configuration of the sub-frame of the base station device may be adjusted to be the same as the uplink and downlink configuration of the sub-frame of the interfered base station device so as to avoid interference, or may be adjusted to be similar to the uplink and downlink configuration of the sub-frame of the interfered base station device so as to reduce interference. Alternatively, uplink and downlink transmissions may be prohibited. For example, the uplink and downlink transmissions may be prohibited for a period of time, or may be permanently prohibited.

According to an embodiment of the present disclosure, the uplink and downlink configuration of a base station device in the existing communication system may be adjusted to reduce interference, or the base station device may be prohibited from performing uplink and downlink transmissions, which can protect the to-be-added communication system, and thereby ensure a system performance of the to-be-added communication system.

According to an embodiment of the present disclosure, the uplink and downlink configuration of a base station device in the to-be-added communication system may be adjusted to reduce interference, or the base station device may be prohibited from performing uplink and downlink transmissions, which can protect the existing communication system, and thereby ensure a system performance of the existing communication system. That is to say, the predetermined interference coordination principle may include: adjusting, with respect to a base station device in the to-be-added communication system which generates interference to any of the base station devices in the existing communication system, uplink and downlink configuration of sub-frames of the base station device to reduce interference, or prohibiting the base station device from performing uplink and downlink transmissions.

According to an embodiment of the present disclosure, in order to protect both the to-be-added communication system and the existing communication system, the adjusting the uplink and downlink configuration of a base station device in the to-be-added communication system to reduce interference or prohibiting the base station device from performing uplink and downlink transmissions, and the adjusting the uplink and downlink configuration of a base station device in the existing communication system to reduce interference or prohibiting the base station device from performing uplink and downlink transmissions may be carried out together. That is to say, the predetermined interference coordination principle may include: adjusting, with respect to a base station device in the existing communication system which generates interference to any of the base station devices in the to-be-added communication system, uplink and downlink configuration of sub-frames of the base station device to reduce interference, or prohibiting the base station device from performing uplink and downlink transmissions; and adjusting, with respect to a base station device in the to-be-added communication system which generates interference to any of the base station devices in the existing communication system, uplink and downlink configuration of sub-frames of the base station device to reduce interference, or prohibiting the base station device from performing uplink and downlink transmissions.

As mentioned above, the interference coordination principle may include information of an object to be adjusted (that is, adjusting the uplink and downlink configuration) or shut down (that is, prohibiting uplink and downlink transmissions), that is, the base station device to be adjusted or shut down in the to-be-added communication system and/or the base station device to be adjusted or shut down in the existing communication system.

According to an embodiment of the present disclosure, since interference between two base stations is closely related to a distance between the two base stations, in order to simplify calculation for the interference, base station devices to be adjusted or shut down may be determined based on the distance between two base stations and the uplink and downlink configurations of sub-frames of the two base stations. For example, the interference coordination principle may include a neighbor-based interference coordination principle with a parameter k. With the neighbor-based interference coordination principle, with respect to a node, the nearest (k−1) nodes from the node among nodes with different uplink and downlink configurations than the node may be adjusted or shut down. For example, in a case where the interference coordination principle indicates to adjust or shut down a base station device in the existing communication system, with respect to each of the base station devices in the to-be-added communication system, (k−1) base station devices in the existing communication system that have different uplink and downlink configurations from the base station device in the to-be-added communication system and are nearest to the base station device in the to-be-added communication system may be adjusted or shut down.

Figure 4:
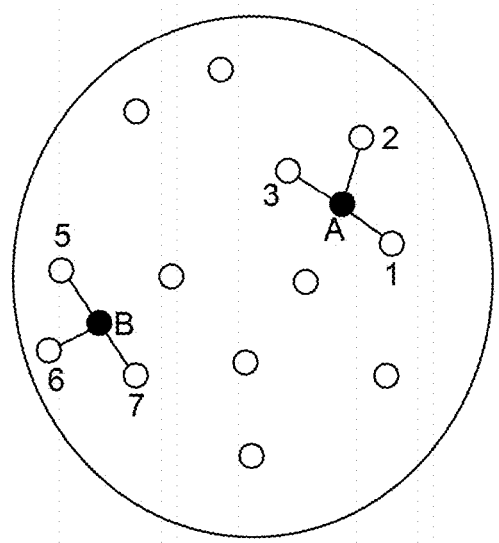
FIG. 4 is a schematic diagram showing interference coordination according to an neighbor-based interference coordination principle according to an embodiment of the present disclosure.

FIG. 4 is a schematic diagram showing interference coordination according to the neighbor-based interference coordination principle according to an embodiment of the present disclosure. In FIG. 4, it is assumed that k=4, and the interference coordination principle indicates to adjust or shut down the base station device in the existing communication system. As shown in FIG. 4, for base station device A, it is assumed that base station devices 1, 2, and 3 all adopt different uplink and downlink configurations from base station device A, and base station devices 1, 2, and 3 are the nearest three base station devices to base station device A. Therefore, base station devices 1, 2, and 3 should be adjusted or shut down. Similarly, for base station device B, it is assumed that base station devices 5, 6, and 7 all adopt different uplink and downlink configurations from base station device B, and base station devices 5, 6, and 7 are the nearest three base station devices to base station device B. Therefore, base station devices 5, 6, and 7 should be adjusted or shut down. FIG. 4 shows an example of adjusting or shutting down a base station device in the existing communication system, which is similar to a situation of adjusting or shutting down a base station device in the to-be-added communication system, and the latter is not repeated herein.

According to an embodiment of the present disclosure, the interference coordination principle may include a radius-based interference coordination principle with a parameter r. With the radius-based interference coordination principle, with respect to a node, nodes with a distance from the node less than or equal to r and with uplink and downlink configurations different from the node may be adjusted or shut down. For example, in a case where the interference coordination principle indicates to adjust or shut down a base station device in the existing communication system, with respect to each of the base station devices in the to-be-added communication system, base station devices in the existing communication system that have different uplink and downlink configurations from the base station device in the to-be-added communication system and with a distance from the base station device in the to-be-added communication system less than or equal to r may be adjusted or shut down.

Figure 5:
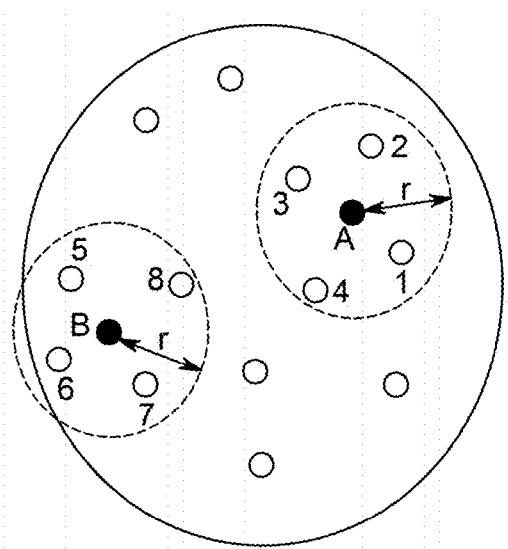
FIG. 5 is a schematic diagram showing interference coordination according to an radius-based interference coordination principle according to an embodiment of the present disclosure.

FIG. 5 is a schematic diagram showing interference coordination according to the radius-based interference coordination principle according to an embodiment of the present disclosure. In FIG. 5, it is assumed that the interference coordination principle indicates to adjust or shut down a base station device in the existing communication system. As shown in FIG. 5, for base station equipment A, there are base station devices 1, 2, 3, and 4 positioned in a circular area with base station device A as a center and with a radius r. Assuming that base station devices 1, 2, 3, and 4 are all adopt different uplink and downlink configurations from base station device A, then base station devices 1, 2, 3, and 4 should be adjusted or shut down. Similarly, for base station device B, there are base station devices 5, 6, 7, and 8 positioned in a circular area with base station equipment B as a center and with a radius r. Assuming that base station devices 5, 6, 7, and 8 are all adopt different uplink and downlink configurations from base station device B, then base station devices 5, 6, 7, and 8 should be adjusted or shut down. FIG. 5 shows an example of adjusting or shutting down a base station device in the existing communication system, which is similar to a situation of adjusting or shutting down a base station device in the to-be-added communication system, and the latter is not repeated herein.

As mentioned above, the interference coordination principle may further include information of a method for determining to adjust or shut down, including but not limited to a neighbor-based method with a parameter of k and a radius-based method with a parameter of r.

According to an embodiment of the present disclosure, the spectrum management device 200 may reasonably determine a value of k or r. For example, the spectrum management device 200 may determine the value of k or r empirically. Alternatively, in a case where the interference coordination principle indicates to adjust or shut down a base station device in the to-be-added communication system, the spectrum management device 200 may determine the value of k or r based on interference on each base station device in the existing communication system.

Figure 6:
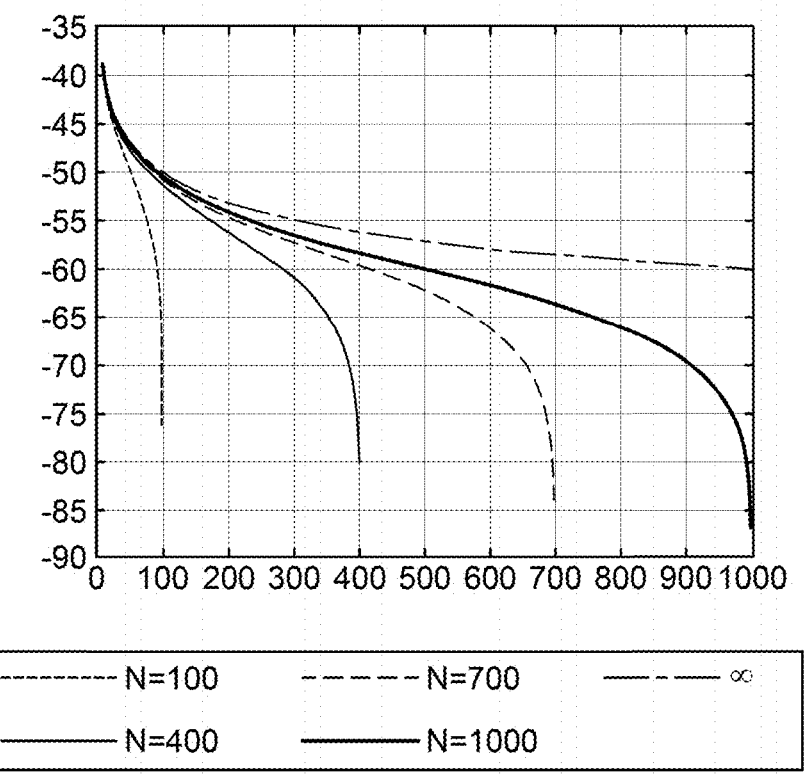
FIG. 6 is a schematic diagram showing a relationship between a simulated interference value and the number of neighbor nodes after interference coordination according to a neighbor-based interference coordination principle according to an embodiment of the present disclosure.

FIG. 6 is a schematic diagram showing a relationship between a simulated interference value and the number of neighbor nodes after interference coordination according to the neighbor-based interference coordination principle according to an embodiment of the present disclosure. In FIG. 6, the horizontal axis represents a value of k (where the interference coordination principle indicates to adjust or shut down a base station device in the to-be-added communication system), and the vertical axis represents an average value of interference (in dB) suffered by each base station device in the existing communication system, and N represents the number of base station devices in a to-be-added communication system. As shown in FIG. 6, curves of changing of the average value of interference suffered by each base station device in the existing communication system with the value of k under conditions N=100, 400, 700, 1000 and infinity are shown respectively. For example, in a case of N=1000, assuming that a threshold of the average value of the interference suffered by each base station device in the existing communication system is −50 dB, it can be seen from FIG. 6 that the value of k is about 90. That is to say, in a case where the number of base station devices in the to-be-added communication system is 1000 and the average value of the interference suffered by each base station device in the existing communication system is less than or equal to −50 dB, the minimum value of k is 90, that is, for each of the base station devices in the existing communication system, at least 89 surrounding base station devices of the to-be-added communication system are adjusted or shut down. Therefore, it is possible to fit the curve of the average value of interference suffered by each base station device in the existing communication system with the value of k through multiple simulations, so as to determine a value of k based on a threshold of the interference suffered by the base station devices in the existing communication system.

Figure 7:
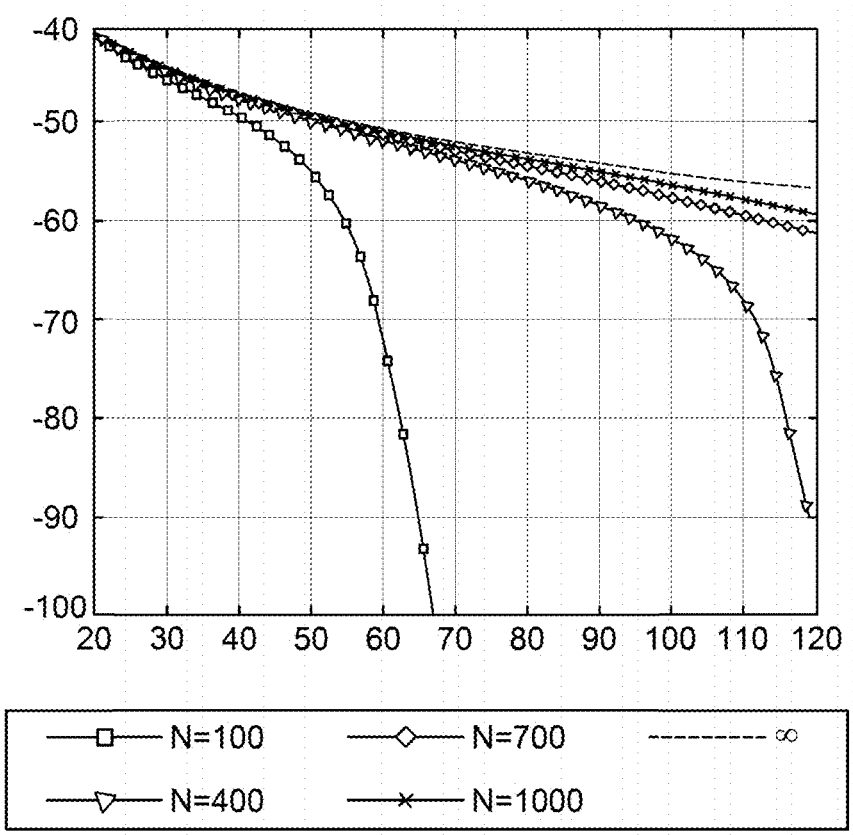
FIG. 7 is a schematic diagram showing a relationship between a simulated interference value and the radius after interference coordination according to a radius-based interference coordination principle according to an embodiment of the present disclosure.

FIG. 7 is a schematic diagram showing a relationship between a simulated interference value and the radius after interference coordination according to a radius-based interference coordination principle according to an embodiment of the present disclosure. In FIG. 7, the horizontal axis represents a value of r (in meters), the interference coordination principle indicates to adjust or shut down a base station device in the to-be-added communication system, and the vertical axis represents an average value of interference (in dB) suffered by each base station device in the existing communication system, and N represents the number of base station devices in a to-be-added communication system. As shown in FIG. 7, curves of changing of the average value of interference suffered by each base station device in the existing communication system with the value of r under conditions N=100, 400, 700, 1000 and infinity are shown respectively. For example, in a case of N=100, assuming that a threshold of the average value of interference suffered by each base station device in the existing communication system is −50 dB, it can be seen from FIG. 7 that the value of r is about 40. That is to say, in a case where the number of base station devices of the to-be-added communication system is 100 and the average value of the interference suffered by each base station device in the existing communication system is less than or equal to −50 dB, the minimum value of r is 40, that is, for each of the base station devices in the existing communication system, at least base station devices in the to-be-added communication system which are within 40 meters from the base station in the existing communication system are adjusted or shut down. Therefore, it is possible to fit the curve of the average value of the interference suffered by each base station device in the existing communication system with the value of r through multiple simulations, so as to determine a value of r based on a threshold of the interference suffered by the base station devices in the existing communication system.

As described above, according to an embodiment of the present disclosure, after interference coordination is performed by the interference coordination unit 210, one or more base station devices in the existing communication system and/or one or more base station devices in the to-be-added communication system are adjusted or shut down.

According to an embodiment of the present disclosure, the performance determining unit 220 may determine the first system performance based on a result of interference coordination from the interference coordination unit 210. Here, various parameters can be used to represent the first system performance.

For example, the performance determining unit 220 may determine the first system performance based on the number of the base station devices whose uplink and downlink configuration of a sub-frame is adjusted or whose uplink and downlink transmissions are prohibited in the to-be-added communication system. For example, in a case where the interference coordination principle indicates to adjust or shut down a base station device in the to-be-added communication system, after interference coordination performed by the interference coordination unit 210, the performance determining unit 220 may determine the total number of adjusted or shut down base station devices in the to-be-added communication system, and represent the first system performance using the total number.

According to an embodiment of the present disclosure, the performance determining unit 220 may determine the first system performance based on the interference suffered by respective base station devices in the to-be-added communication system after the interference coordination is performed. For example, the performance determining unit 220 may determine the first system performance based on an average value of interference suffered by respective base station devices in the to-be-added communication system after the interference coordination is performed.

According to an embodiment of the present disclosure, the performance determining unit 220 may determine the first system performance based on both the number of the base station devices whose uplink and downlink configuration of a sub-frame is adjusted or whose uplink and downlink transmissions are prohibited in the to-be-added communication system, and the interference suffered by respective base station devices in the to-be-added communication system after interference coordination is performed. In other words, the first system performance may include the above two parameters, or include another parameter determined using the above two parameters.

As described above, according to an embodiment of the present disclosure, the performance determining unit 220 may determine a system performance of the to-be-added communication system in the case where spectrum management is performed by the spectrum management device 200 on the to-be-added communication system, so that the to-be-added communication system may determine, based on the system performance, whether to be added to the spectrum management device 200. For example, in a case where the first system performance is less than a predetermined threshold (for example, the number of base station devices adjusted or shut down is less than a predetermined threshold, and/or an average value of interference suffered by respective base station devices is less than a predetermined threshold), which indicates that the system performance after the to-be-added communication system is added to the spectrum management device 200 is within an acceptable range, the electronic device that manages the to-be-added communication system may determine to add the to-be-added communication system to the spectrum management device 200, otherwise the electronic device may reject adding the to-be-added communication system to the spectrum management device 200.

According to an embodiment of the present disclosure, the performance determining unit 220 may determine a second system performance of the to-be-added communication system in a case where no interference coordination is performed. That is, the second system performance represents a system performance of the to-be-added communication system in a case where no spectrum management is performed by the spectrum management device 200 on the to-be-added communication system. In the case where no spectrum management is performed by the spectrum management device 200 on the to-be-added communication system, the spectrum management device 200 performs no coordination on interference between the base station devices in the to-be-added communication system and the base station devices in the existing communication system. That is, no base station device in the to-be-added communication system or the existing communication system is to be adjusted or shut down by the spectrum management device 200. In this case, the system performance of the to-be-added communication system may decrease. In the specification, the second system performance is also referred to as a non-coordinated system performance of the to-be-added communication system.

According to an embodiment of the present disclosure, the performance determining unit 220 may determine the second system performance based on the interference suffered by respective base station devices in the to-be-added communication system in a case where no interference coordination is performed. For example, the performance determining unit 220 may determine the second system performance based on an average value of interference suffered by respective base station devices in the to-be-added communication system in a case where no interference coordination is performed.

According to an embodiment of the present disclosure, the spectrum management device 200 may transmit the second system performance of the to-be-added communication system to the electronic device through the communication unit 230, for the electronic device to determine, based on the first system performance and the second system performance, whether to agree to perform spectrum management by the spectrum management device 200 on the to-be-added communication system.

As described above, according to an embodiment of the present disclosure, the performance determining unit 220 may determine the first system performance of the to-be-added communication system in a case where spectrum management is performed by the spectrum management device 200 on the to-be-added communication system, and the second system performance of the to-be-added communication system in a case where no spectrum management is performed by the spectrum management device 200 on the to-be-added communication system, and therefore it may be determined, based on the first system performance and the second system performance, whether to add the to-be-added communication system to the spectrum management device 200. For example, in a case where the first system performance is less than a predetermined threshold and/or a difference between the first system performance and the second system performance is greater than a predetermined threshold, which indicates that the system performance after the to-be-added communication system is added to the spectrum management device 200 is within an acceptable range, and the system performance is improved to a certain extent, the electronic device that manages the to-be-added communication system may determine to add the to-be-added communication system to the spectrum management device 200.

Figure 8:
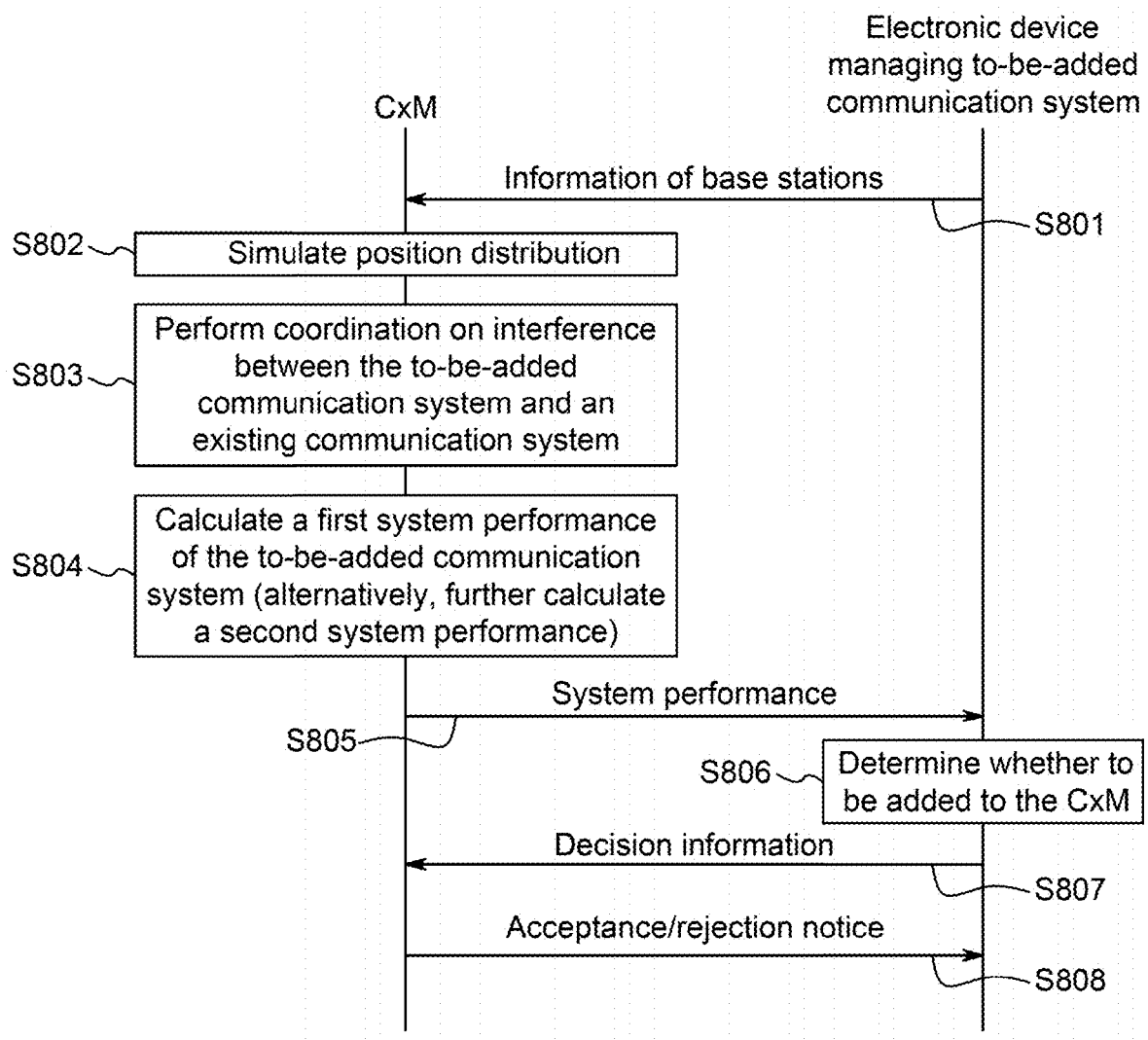
FIG. 8 is a signaling flow chart for determining whether to perform, by a spectrum management device, spectrum management on a to-be-added communication system according to an embodiment of the present disclosure.

FIG. 8 is a signaling flowchart for determining whether to perform, by a spectrum management device, spectrum management on a to-be-added communication system according to an embodiment of the present disclosure. In FIG. 8, CxM may be implemented by the spectrum management device 200. As shown in FIG. 8, in step S801, an electronic device that manages a to-be-added communication system transmits, to a CxM, information of all base station devices in the to-be-added communication system. In step S802, the CxM simulates a position distribution based on the information of all base station devices in the to-be-added communication system. In step S803, the CxM performs coordination on interference between the base station devices in the to-be-added communication system and the base station devices in the existing communication system according to a predetermined interference coordination principle. In step S804, the CxM calculates a first system performance of the to-be-added communication system. Alternatively, the CxM may calculate a second system performance of the to-be-added communication system. Next, in step S805, the CxM transmits, to the electronic device, the calculated first system performance, or both the first system performance and the second system performance. In step S806, the electronic device determines whether to add the to-be-added communication system to the CxM. In step S807, the electronic device transmits, to the CxM, decision information indicating whether to add the to-be-added communication system to the CxM. Then, in a case where the decision information indicates that the to-be-added communication system agrees to be added to the CxM, in step S808, the CxM may transmit to the electronic device an acceptance notice indicating acceptance to the to-be-added communication system, and perform spectrum management on the to-be-added communication system.

As mentioned above, the to-be-added communication system may determine, based on the system performance calculated by the spectrum management device 200, whether to be added to the spectrum management device 200, and therefore, whether to perform spectrum management by the spectrum management device 200 on the to-be-added communication system may be determined reasonably.

According to an embodiment of the present disclosure, the performance determining unit 220 may determine, based on a result of interference coordination, a third system performance of an existing communication systems managed by the spectrum management device 200. Here, the third system performance represents a system performance of the existing communication systems in a case where spectrum management is performed by the spectrum management device 200 on the to-be-added communication system. In addition, since there may be multiple existing communication systems managed by the spectrum management device 200, the performance determining unit 220 may determine the third system performance of respective existing communication systems. In this disclosure, the third system performance is also referred to as a coordinated system performance of the existing communication system.

According to an embodiment of the present disclosure, a method of calculating the third system performance may be similar to the method of calculating the first system performance by the performance determining unit 220. For example, the performance determining unit 220 may determine the third system performance of the existing communication system based on the number of base station devices whose uplink and downlink configuration is adjusted or whose uplink and downlink transmissions are prohibited in the existing communication system.

For example, in a case where the interference coordination principle indicates to adjust or shut down a base station device in the existing communication system, after interference coordination is performed by the interference coordination unit 210, the performance determining unit 220 may determine a total number of adjusted or shut down base station devices in the existing communication system, and thus the third system performance is represented by using this total number.

According to an embodiment of the present disclosure, the performance determining unit 220 may determine the third system performance based on interference suffered by respective base station devices in the existing communication system after interference coordination is performed. For example, the performance determining unit 220 may determine the third system performance based on an average value of the interference suffered by respective base station devices in the existing communication system after interference coordination is performed.

According to an embodiment of the present disclosure, the performance determining unit 220 may determine the third system performance based on both the number of the base station devices whose uplink and downlink configuration is adjusted or whose uplink and downlink transmissions are prohibited in the existing communication system, and the interference suffered by respective base station devices in the existing communication system after interference coordination is performed. In other words, the third system performance may include the above two parameters, or include another parameter determined using the above two parameters.

According to an embodiment of the present disclosure, the spectrum management device 200 may transmit the third system performance of respective existing communication systems to respective electronic devices that manage respective existing communication systems through the communication unit 230, for the respective electronic devices to determine whether to agree to perform spectrum management by the spectrum management device 200 on the to-be-added communication system. For example, in a case where the third system performance is less than a predetermined threshold (for example, the number of base station devices that are adjusted or shut down is less than a predetermined threshold, or the average value of interference suffered by respective base station devices is less than a predetermined threshold), which indicates that there is not much impact on the system performance of the existing communication systems after the to-be-added communication system is added to the spectrum management device 200, the electronic device that manages the existing communication system may agree to add the to-be-added communication system to the spectrum management device 200, otherwise the electronic device does reject adding the to-be-added communication system to the spectrum management device 200.

According to an embodiment of the present disclosure, the performance determining unit 220 may determine a fourth system performance of an existing communication system managed by the spectrum management device 200 in a case where no interference coordination is performed. That is, the fourth system performance indicates a system performance of the existing communication system in a case where no spectrum management is performed by the spectrum management device 200 on the to-be-added communication system. In the case where no spectrum management is performed by the spectrum management device 200 on the to-be-added communication system, the spectrum management device 200 performs no coordination on interference between the base station devices in the to-be-added communication system and the base station devices in the existing communication system, that is, no base station device in the to-be-added communication system or the existing communication system is to be adjusted or shut down by the spectrum management device 200. In this case, the system performance of the existing communication system may decrease. In the disclosure, the fourth system performance is also referred to as a non-coordinated system performance of the existing communication system.

According to an embodiment of the present disclosure, the performance determining unit 220 may determine the fourth system for any existing communication system based on interference suffered by respective base station devices in the existing communication system in a case where no interference coordination is performed. For example, the performance determining unit 220 may determine the fourth system performance based on an average value of interference suffered by respective base station devices in the existing communication system in a case where no interference coordination is performed.

According to an embodiment of the present disclosure, the spectrum management device 200 may transmit the fourth system performance of respective existing communication systems to respective electronic devices that manage the respective existing communication systems through the communication unit 230, for the electronic devices to determine whether to agree to perform spectrum management by the spectrum management device 200 on the to-be-added communication system.

As described above, according to the embodiments of the present disclosure, the performance determining unit 220 may determine the third system performance of the existing communication system in a case where spectrum management is performed by the spectrum management device 200 on the to-be-added communication system and the fourth system performance of the existing communication system in a case where no spectrum management is performed by the spectrum management device 200 on the to-be-added communication system, so that the existing communication system may determine, based on the third system performance and the fourth system performance, whether to agree to add the to-be-added communication system to the spectrum management device 200. For example, in a case where the third system performance is less than a predetermined threshold and/or a difference between the third system performance and the fourth system performance is greater than a predetermined threshold, which indicates that the to-be-added communication system, after added to the spectrum management device 200, does not have much impact on the existing communication system, and the system performance is improved to a certain extent, the electronic device that manages the existing communication system may agree to add the to-be-added communication system to the spectrum management device 200.

In the present disclosure, the interference coordination unit 210 may simulate a position distribution of the base station devices of the to-be-added communication system, and perform interference coordination. The performance determining unit 220 may determine the first system performance and/or the third system performance based on the position distribution and a result of interference coordination, and the performance determining unit 220 may determine the second system performance and/or the fourth system performance based on the position distribution. According to an embodiment of the present disclosure, the interference coordination unit 210 and the performance determining unit 220 may perform the above process repeatedly to determine a final system performance based on an average value of the multiple calculations.

According to an embodiment of the present disclosure, the spectrum management device 200 may receive, through the communication unit 230, a first decision indicating whether to agree to perform spectrum management by the spectrum management device 200 on the to-be-added communication system from an electronic device that manages the to-be-added communication system, and a second decision indicating whether to agree to perform spectrum management by the spectrum management device 200 on the to-be-added communication system from respective electronic devices that manage respective existing communication systems. Here, since there may be multiple existing communication systems managed by the spectrum management device 200, there may be multiple second decisions.

As shown in FIG. 2, according to an embodiment of the present disclosure, the spectrum management device 200 may further include a decision-making unit 240, which is configured to determine, based on the first decision and the second decision, whether to perform spectrum management by the spectrum management device 200 on the to-be-added communication system. Here, in a case where the first decision indicates that the to-be-added communication system agrees to be added to the spectrum management device 200, and one or more second decisions indicate that the number of existing communication systems that agree to add the to-be-added communication system to the spectrum management device 200 exceeds a predetermined number, the decision-making unit 240 may determine to perform spectrum management by the spectrum management device 200 on the to-be-added communication system, or otherwise, the decision-making unit 240 may determine to perform no spectrum management by the spectrum management device 200 on the to-be-added communication system.

According to an embodiment of the present disclosure, the spectrum management device 200 may transmit, through the communication unit 230 to the electronic device that manages the to-be-added communication system, an acceptance notification indicating that the to-be-added communication system is agreed to be added to the spectrum management device 200 or a rejection notice indicating that the to-be-added communication system is not agreed to be added to the spectrum management device 200.

As shown in FIG. 2, according to an embodiment of the present disclosure, the spectrum management device 200 may further include a spectrum management unit 250, which is configured to perform spectrum management on the existing communication system managed by the spectrum management device 200. Here, in a case where the decision-making unit 240 determines to perform spectrum management by the spectrum management device 200 on the to-be-added communication system, the to-be-added communication system becomes an existing communication system, and the spectrum management unit 250 may perform spectrum management on the to-be-added communication system. According to an embodiment of the present disclosure, spectrum management may include allocating spectrum resources to an existing communication system, determining the uplink and downlink configuration of subframes of base station devices in the existing communication system, and performing coordination on interference between the base station devices, and the like.

Figure 9:
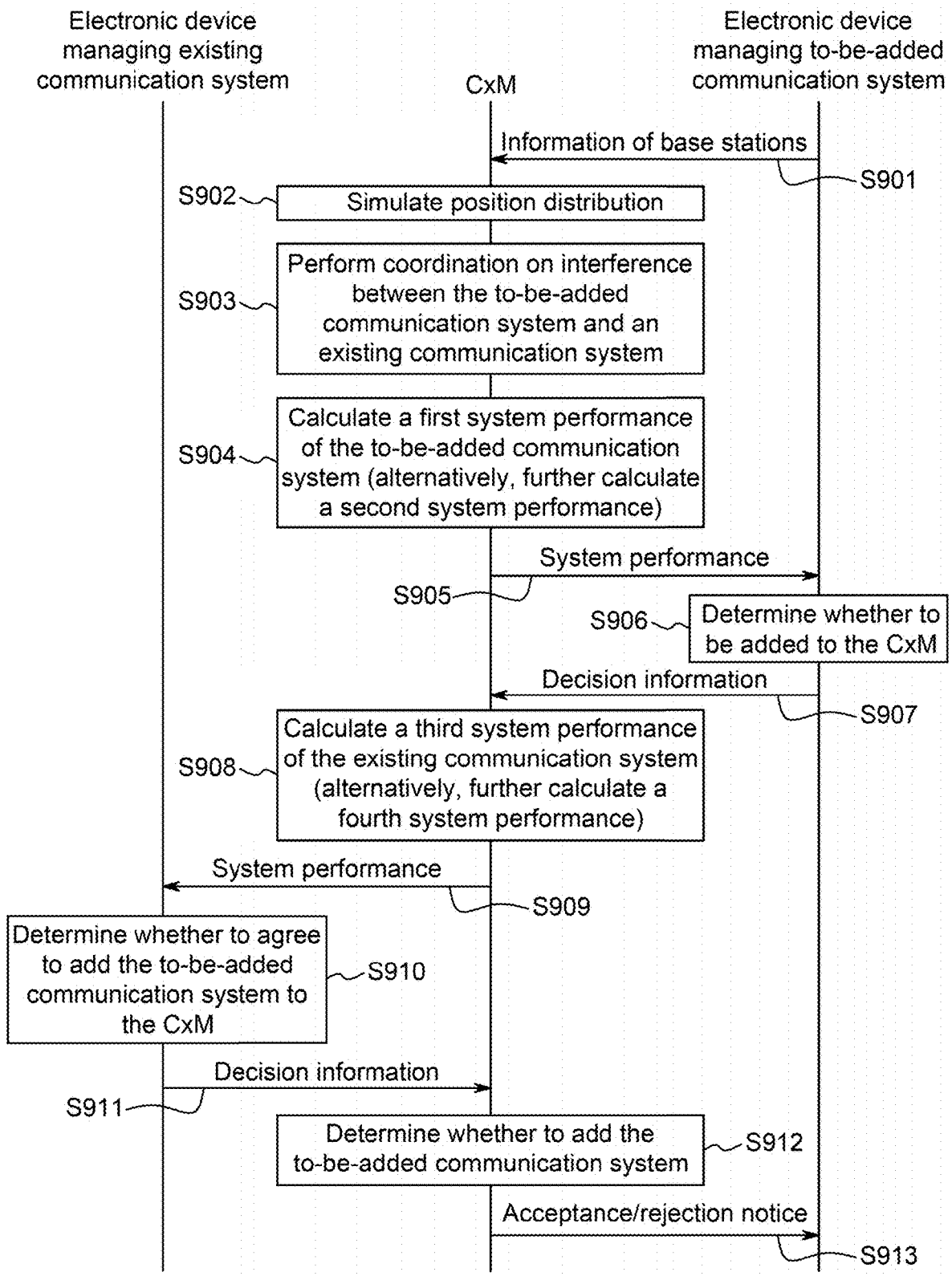
FIG. 9 is a signaling flowchart for determining whether to perform, by a spectrum management device, spectrum management on a to-be-added communication system according to an embodiment of the present disclosure.

FIG. 9 is a signaling flowchart for determining whether to perform spectrum management by a spectrum management device on a to-be-added communication system according to an embodiment of the present disclosure. In FIG. 9, CxM may be implemented by the spectrum management device 200. As shown in FIG. 9, in step S901, an electronic device that manages the to-be-added communication system transmits, to the CxM, information of all base station devices in the to-be-added communication system. In step S902, the CxM simulates a position distribution based on the information of all base station devices in the to-be-added communication system. In step S903, the CxM performs coordination on interference between the base station devices in the to-be-added communication system and the base station devices in the existing communication system according to a predetermined interference coordination principle. In step S904, the CxM calculates a first system performance of the to-be-added communication system. Alternatively, the CxM may calculate a second system performance of the to-be-added communication system. Next, in step S905, the CxM transmits the calculated first system performance, or both the first system performance and the second system performance, to the electronic device that manages the to-be-added communication system. In step S906, the electronic device that manages the to-be-added communication system determines whether to add the to-be-added communication system to the CxM. In step S907, the electronic device that manages the to-be-added communication system transmits to the CxM, decision information indicating whether to add the to-be-added communication system to the CxM. In step S908, the CxM calculates third system performances of respective existing communication systems. Alternatively, the CxM may calculate fourth system performances of respective existing communication systems. Next, in step S909, the CxM transmits the calculated third system performance, or both the third system performance and the fourth system performance, to the electronic device that manages the existing communication system. In step S910, the electronic device that manages the existing communication system determines whether to agree to add the to-be-added communication system to the CxM. In step S911, the electronic device that manages the existing communication system transmits, to the CxM, decision information indicating whether to agree to add the to-be-added communication system to the CxM. In step S912, the CxM determines, based on the decision information from the existing communication system and the decision information from the to-be-added communication system, whether to perform spectrum management on the to-be-added communication system. In step S913, the CxM transmits, to the electronic device that manages the to-be-added communication system, an acceptance notification indicating that the to-be-added communication system is agreed to be added to the CxM or a rejection notification indicating that the to-be-added communication system is not agreed to be added to the CxM.

According to an embodiment of the present disclosure, the spectrum management device 200 may first transmit the system performance to the electronic device that manages the to-be-added communication system and receive decision information from the electronic device. In a case where the electronic device that manages the to-be-added communication system agrees to add the to-be-added communication system to the spectrum management device 200, the spectrum management device 200 may then transmit the system performance to the electronic device that manages the existing communication system and receive decision information from the electronic device that manages the existing communication system. Alternatively, the spectrum management device 200 may first transmit the system performance to the electronic device that manages the existing communication system and receive decision information from the electronic device. In a case where the number of communication systems, among the existing communication system, that agree to add the to-be-added communication system to the spectrum management device 200 exceeds a predetermined number, the spectrum management device 200 may then transmit the system performance to the electronic device that manages the to-be-added communication system and receive decision information from the electronic device. Alternatively, the spectrum management device 200 may simultaneously transmit respective system performances to the electronic device that manages the to-be-added communication system and the electronic device that manages the existing communication system.

As described above, since the to-be-added communication system, after added to the spectrum management device 200, may affect the system performance of the existing communication system, the spectrum management device 200 may determine whether to perform spectrum management on the to-be-added communication system based on the decision from the to-be-added communication system and the decision from the existing communication system, so as to obtain a more reasonable result of determination, and avoid significant decrease of the system performance of the existing communication system while ensuring the system performance of the to-be-added communication system.

3. Configuration Example of an Electronic Device

Figure 10:
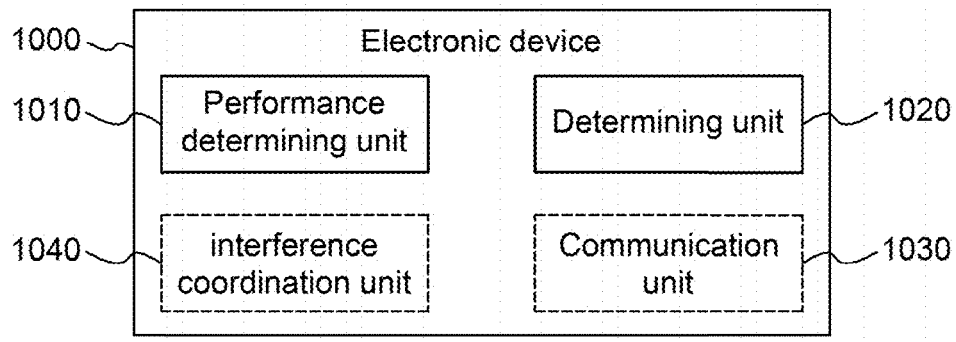
FIG. 10 is a block diagram showing an example of a configuration of an electronic device according to an embodiment of the present disclosure.

FIG. 10 is a block diagram showing a structure of an electronic device 1000 that manages a to-be-added communication system in a wireless communication system according to an embodiment of the present disclosure. The electronic device 1000 may be integrated in a certain base station device of the to-be-added communication system, or may be a device independent from base station devices in the to-be-added communication system. The to-be-added communication system may include one or more base station devices. In a case where the to-be-added communication system includes only one base station device, the electronic device 1000 may be the base station device.

As shown in FIG. 10, the electronic device 1000 may include a performance determining unit 1010 and a determining unit 1020.

Here, units of the electronic device 1000 may be included in a processing circuit. It should be noted that the electronic device 1000 may include one processing circuit or multiple processing circuits. Further, the processing circuit may include various discrete functional units for performing various different functions and/or operations. It should be noted that these functional units may be physical entities or logical entities, and units with different titles may be implemented by the same physical entity.

According to an embodiment of the present disclosure, the performance determining unit 1010 may be configured to determine a first system performance of a to-be-added communication system managed by the electronic device 1000 in a case where interference coordination is performed by a spectrum management device.

According to an embodiment of the present disclosure, the determining unit 1020 may determine, based on the first system performance, whether to agree to perform spectrum management by the spectrum management device on the to-be-added communication system.

The interference coordination here may include: performing, according to a predetermined interference coordination principle, coordination on interference between one or more base station devices in the to-be-added communication system and one or more base station devices in the existing communication system managed by the spectrum management device.

As described above, according to an embodiments of the present disclosure, the electronic device 1000 that manages the to-be-added communication system may determine a system performance of the to-be-added communication system in a case where spectrum management is performed by the spectrum management device on the to-be-added communication system, and determine, based on the system performance, whether to add the to-be-added communication system to the spectrum management device. In this way, whether to perform spectrum management by the spectrum management device on the to-be-added communication system may be determined more reasonably.

According to an embodiment of the present disclosure, as shown in FIG. 10, the electronic device 1000 may include a communication unit 1030, which is configured to receive, from the spectrum management device, information related the first system performance, for the performance determining unit 1010 to determine the first system performance based on the information related the first system performance.

According to an embodiment of the present disclosure, the electronic device 1000 may be configured to transmit information of one or more base station devices in the to-be-added communication system to the spectrum management device through the communication unit 1030. Here, the information of the one or more base station devices in the to-be-added communication system may include: the number of base station devices in the to-be-added communication system, uplink and downlink configuration of subframes of each of the base station devices, and a maximum transmission power of each of the base station devices.

Alternatively, the information of the one or more base station devices in the to-be-added communication system may further include position distribution information of the one or more base station devices in the to-be-added communication system. The electronic device 1000 may be further configured to receive, from the spectrum management device through the communication unit 1030, the first system performance of the to-be-added communication system determined based on the information of the one or more base station devices in the to-be-added communication system.

According to an embodiment of the present disclosure, the performance determining unit 1010 may be configured to determine, based on the first system performance, the number of base station devices whose uplink and downlink configuration is adjusted or whose uplink and downlink transmissions are prohibited in the to-be-added communication system, and/or interference suffered by respective base station devices in the to-be-added communication system in a case where interference coordination is performed by the spectrum management device.

According to an embodiment of the present disclosure, the determining unit 1020 may be configured to determine, based on the first system performance, whether to agree to add the to-be-added communication system to the spectrum management device. For example, in a case where the first system performance is less than a predetermined threshold, the determining unit 1020 may determine to agree to perform spectrum management by the spectrum management device on the to-be-added communication system; and in a case where the first system performance is greater than or equal to the predetermined threshold, the determining unit 1020 may determine to reject to perform spectrum management by the spectrum management device on the to-be-added communication system.

According to an embodiment of the present disclosure, the determining unit 1020 may be configured to determine whether to agree to perform spectrum management by the spectrum management device on the to-be-added communication system based on the number of base station devices whose uplink and downlink configuration is adjusted or whose uplink and downlink transmissions are prohibited in the to-be-added communication system. For example, in a case where the number of base station devices whose uplink and downlink configuration is adjusted or whose uplink and downlink transmissions are prohibited in the to-be-added communication system is less than a predetermined threshold, the determining unit 1020 may determine to agree to perform spectrum management by the spectrum management device on the to-be-added communication system; or otherwise, the determining unit 1020 may determine to reject to perform spectrum management by the spectrum management device on the to-be-added communication system. Alternatively, the determining unit 1020 may be further configured to determine whether to agree to perform spectrum management by the spectrum management device on the to-be-added communication system based on the interference suffered by respective base station devices in the to-be-added communication system in a case where interference coordination is performed by the spectrum management device. For example, in a case where an average value of the interference suffered by respective base station devices in the to-be-added communication system is less than a predetermined threshold in a case where interference coordination is performed by the spectrum management device, the determining unit 1020 may determine to agree to perform spectrum management by the spectrum management device on the to-be-added communication system; or otherwise, the determining unit 1020 may determine to reject to perform spectrum management by the spectrum management device on the to-be-added communication system. In addition, the determining unit 1020 may comprehensively consider both the above parameters to determine whether to agree to perform spectrum management by the spectrum management device on the to-be-added communication system.

According to an embodiment of the present disclosure, the electronic device 1000 may be configured to receive, from the spectrum management device through the communication unit 1030, a second system performance of the to-be-added communication system in a case where no interference coordination is performed by the spectrum management device.

According to an embodiment of the present disclosure, the performance determining unit 1010 may be configured to determine, based on the second system performance, interference suffered by respective base station devices in the to-be-added communication system in a case where no interference coordination is performed by the spectrum management device.

According to an embodiment of the present disclosure, the determining unit 1020 may determine whether to agree to perform spectrum management by the spectrum management device on the to-be-added communication system based on the first system performance and the second system performance. Alternatively, in a case where a difference between the first system performance and the second system performance is greater than a predetermined threshold, the determining unit 1020 may determine to agree to perform spectrum management by the spectrum management device on the to-be-added communication system, otherwise the determining unit 1020 may determine to reject to perform spectrum management by the spectrum management device on the to-be-added communication system. For example, the determining unit 1020 may determine to agree to perform spectrum management by the spectrum management device on the to-be-added communication system, in a case where the average value of the interference suffered by respective base station devices in the to-be-added communication system in a case where interference coordination is performed is relatively small, and the average value of the interference suffered by respective base station devices in the to-be-added communication system in a case where no interference coordination is performed is relatively large. Alternatively, in a case where the first system performance is less than a predetermined threshold, and a difference between the first system performance and the second system performance is greater than a predetermined threshold, the determining unit 1020 may determine to agree to perform spectrum management by the spectrum management device on the to-be-added communication system, or otherwise, the determining unit 1020 may determine to reject to perform spectrum management by the spectrum management device on the to-be-added communication system. For example, the determining unit 1020 may determine to agree to perform spectrum management by the spectrum management device on the to-be-added communication system, in a case where the number of adjusted or shut down base station devices is less than a predetermined threshold, the average value of the interference suffered by respective base station devices in the to-be-added communication system in a case where interference coordination is performed is relatively small, and the average value of the interference suffered by respective base station devices in the to-be-added communication system in a case where no interference coordination is performed is relatively large.

As described above, according to the embodiments of the present disclosure, the electronic device 1000 may receive the first system performance, alternatively both the first system performance and the second system performance, of the to-be-added communication system from the spectrum management device, and determine whether to agree to add the to-be-added communication system to the spectrum management device based on the first system performance, or both the first system performance and the second system performance.

According to an embodiment of the present disclosure, the first system performance and/or the second system performance of the to-be-added communication system may be determined by the performance determining unit 1010 of the electronic device 1000.

According to an embodiment of the present disclosure, the electronic device 1000 may receive, from the spectrum management device through the communication unit 1030, information of the one or more base station devices in each existing communication system managed by the spectrum management device and an interference coordination principle.

Here, the information of the base station devices in each existing communication system may include the number of base station devices in the existing communication system, uplink and downlink configuration of sub-frames of each of the base station devices, and a maximum transmission power of each of the base station devices. Alternatively, the information of the base station devices in each existing communication system may further include position distribution information of the base station devices in the existing communication system.

Here, the interference coordination principle may include information of an object to be adjusted or shut down, that is, the base station device to be adjusted or shut down in the to-be-added communication system and/or the base station device to be adjusted or shut down in the existing communication system. For example, the interference coordination principle may include: adjusting, with respect to a base station device in the existing communication system which generates interference to any of the base station devices in the to-be-added communication system, uplink and downlink configuration of sub-frames of the base station device to reduce interference, or prohibiting the base station device from performing uplink and downlink transmissions; and/or adjusting, with respect to a base station device in the to-be-added communication system which generates interference to any of the base station devices in the existing communication system, uplink and downlink configuration of sub-frames of the base station device to reduce interference, or prohibiting the base station device from performing uplink and downlink transmissions. The interference coordination principle may further include information of a method for determining to adjust or shut down, including but not limited to a neighbor-based method and a radius-based method.

As shown in FIG. 10, according to an embodiment of the present disclosure, the electronic device 1000 may further include an interference coordination unit 1040, which is configured to simulate a position distribution of the one or more base station devices in the to-be-added communication system based on the information of the one or more base station devices in the to-be-added communication system. In addition, the interference coordination unit 1040 may be further configured to simulate a position distribution of the base station devices in each existing communication system based on the information of the base station devices in the existing communication system. Further, the interference coordination unit 1040 may perform coordination on interference between the base station devices in the existing communication system and the base station devices in the to-be-added communication system according to the received interference coordination principle and the simulated position distributions. Here, the interference coordination unit 1040 may perform interference coordination using a method similar to that of the interference coordination unit 210. Therefore, all the embodiments of the interference coordination unit 210 described above are applicable thereto, and are not repeated herein.

According to an embodiment of the present disclosure, the performance determining unit 1010 may be configured to determine, based on a result of interference coordination, the first system performance of the to-be-added communication system. For example, the performance determining unit 1010 may determine the first system performance based on the number of the base station devices whose uplink and downlink configuration is adjusted or whose uplink and downlink transmissions are prohibited in the to-be-added communication system, and/or interference suffered by respective base station devices in the to-be-added communication system after the interference coordination is performed. Further, the determining unit 1020 may determine, based on the first system performance determined by the performance determining unit 1010, whether to agree to perform spectrum management by the spectrum management device on the to-be-added communication system.

According to an embodiment of the present disclosure, the performance determining unit 1010 may be further configured to determine a second system performance of the to-be-added communication system in a case where no interference coordination is performed by the spectrum management device. For example, the performance determining unit 1010 may determine the second system performance based on the interference suffered by respective base station devices in the to-be-added communication system in a case where no interference coordination is performed by the spectrum management device. Further, the determining unit 1020 may determine whether to agree to perform spectrum management by the spectrum management device on the to-be-added communication system based on the first system performance and the second system performance determined by the performance determining unit 1010.

Here, the performance determining unit 1010 may determine system performances of communication systems using a method similar to that for the performance determining unit 220. Therefore, all the embodiments of the performance determining unit 220 described above are applicable thereto, and are not repeated herein.

According to an embodiment of the present disclosure, the electronic device 1000 may transmit, to the spectrum management device through the communication unit 1030, decision information indicating whether to agree to perform spectrum management by the spectrum management device on the to-be-added communication system. Further, the electronic device 1000 may receive, from the spectrum management device through the communication unit 1030, an acceptance notification indicating that the to-be-added communication system is agreed to be added to the spectrum management device or a rejection notification indicating that the to-be-added communication system is rejected to be added to the spectrum management device.

Figure 11:
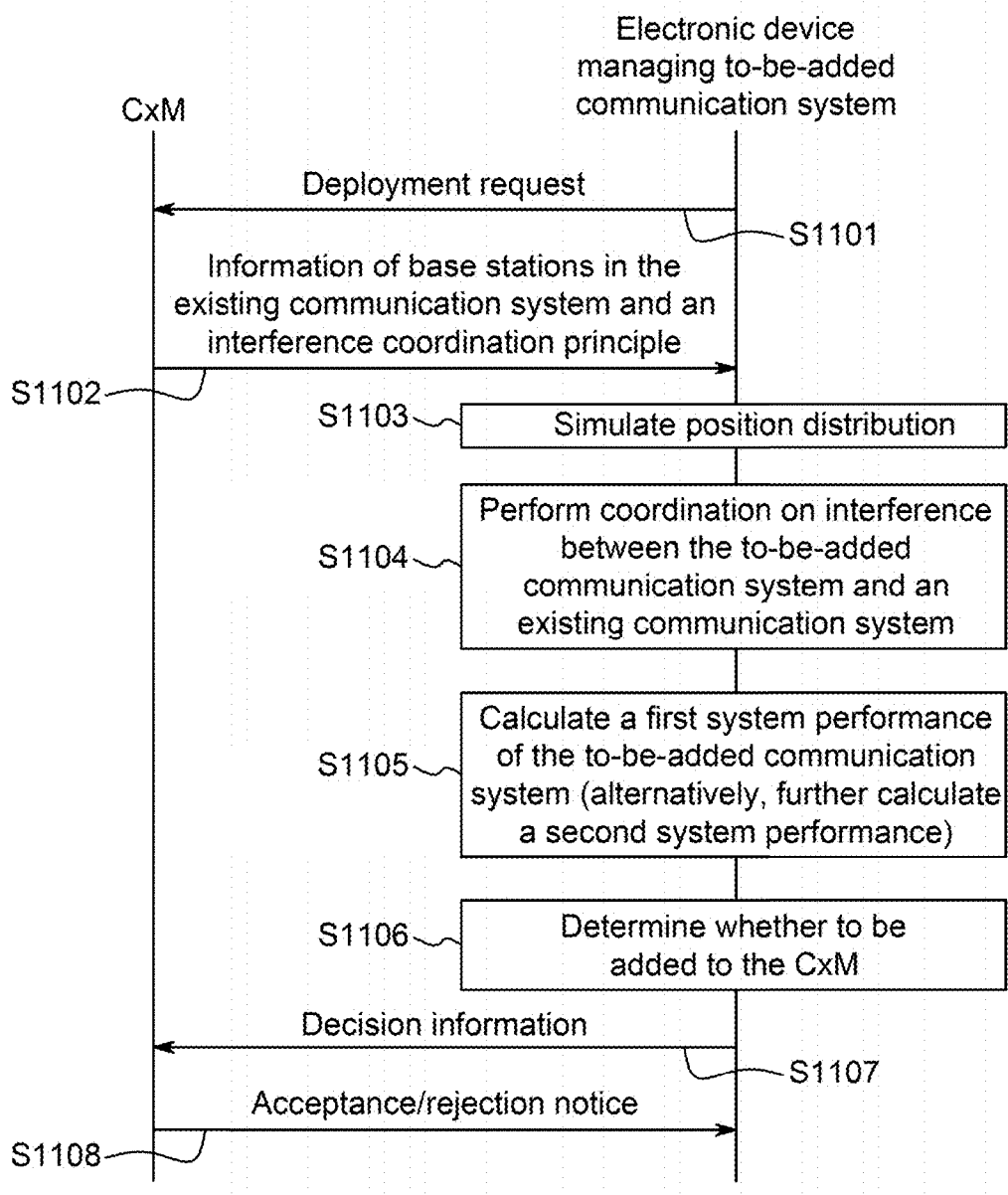
FIG. 11 is a signaling flowchart for determining whether to perform, by a spectrum management device, spectrum management on a to-be-added communication system according to an embodiment of the present disclosure.

FIG. 11 is a signaling flowchart for determining whether to perform spectrum management by a spectrum management device on a to-be-added communication system according to an embodiment of the present disclosure. In FIG. 11, a CxM may be implemented by the spectrum management device 200, and the electronic device that manages the to-be-added communication system may be implemented by the electronic device 1000. As shown in FIG. 11, in step S1101, the electronic device that manages the to-be-added communication system transmits, to the CxM, a deployment request to request information of base station devices in the existing communication system and an interference coordination principle. In step S1102, the CxM transmits, to the electronic device 1000 that manages the to-be-added communication system, the information of the base station devices in the existing communication system and the interference coordination principle. In step S1103, the electronic device 1000 of the to-be-added communication system simulates a position distribution based on the information of all the base station devices in the to-be-added communication system and the information of the base station devices in the existing communication system. In step S1104, the electronic device 1000 of the to-be-added communication system performs, according to a predetermined interference coordination principle, coordination on interference between the base station devices in the to-be-added communication system and the base station devices in the existing communication system. In step S1105, the electronic device 1000 of the to-be-added communication system calculates a first system performance of the to-be-added communication system. Alternatively, the electronic device 1000 of the to-be-added communication system may calculate a second system performance of the to-be-added communication system. Next, in step S1106, the electronic device 1000 of the to-be-added communication system determines whether to add the to-be-added communication system to the CxM. In step S1107, the electronic device 1000 of the to-be-added communication system transmits, to the CxM, decision information indicating whether to add the to-be-added communication system to the CxM. Next, in a case that the decision information indicates that the to-be-added communication system agrees to be added to the CxM, in step S1108, the CxM may transmit, to the electronic device 1000 of the to-be-added communication system, an acceptance notice indicating that it is agreed to add the to-be-added communication system to the CxM, so as to perform spectrum management on the to-be-added communication system.

As described above, the electronic device that manages the to-be-added communication system may determine a system performance of the to-be-added communication system, and the spectrum management device may determine, only based on the decision information from the electronic device, whether to agree to perform spectrum management on the to-be-added communication system.

Figure 12:
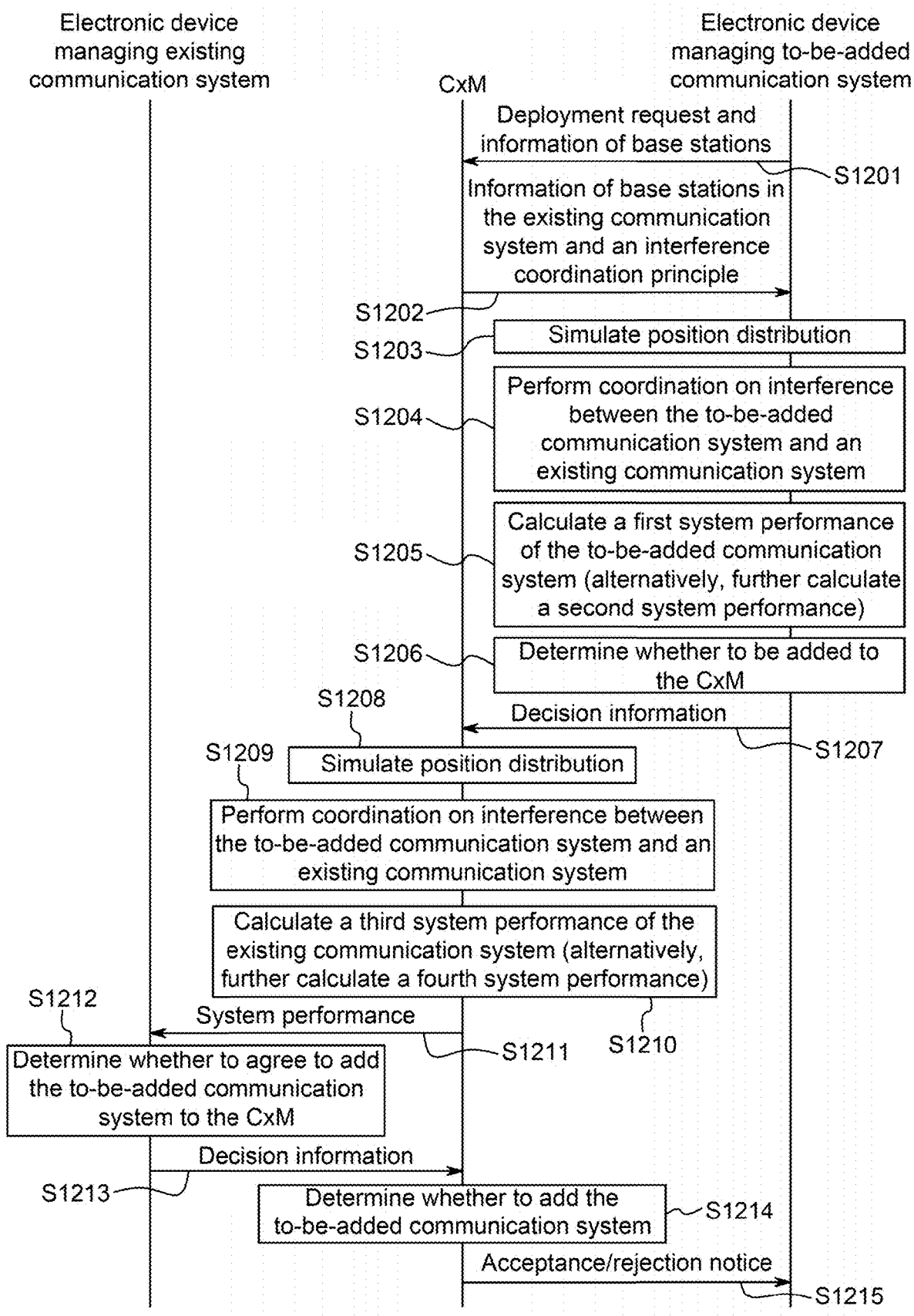
FIG. 12 is a signaling flowchart for determining whether to perform, by a spectrum management device, spectrum management on a to-be-added communication system according to an embodiment of the present disclosure.

FIG. 12 is a signaling flowchart for determining whether to perform, by a spectrum management device, spectrum management on a to-be-added communication system according to an embodiment of the present disclosure. In FIG. 12, the CxM may be implemented by the spectrum management device 200, and the electronic device that manages the to-be-added communication system may be implemented by the electronic device 1000. As shown in FIG. 12, in step S1201, the electronic device that manages the to-be-added communication system transmits, to the CxM, a deployment request and information of base station devices in the to-be-added communication system to request for information of base station devices in the existing communication system and an interference coordination principle. In step S1202, the CxM transmits, to the electronic device 1000 that manages the to-be-added communication system, the information of base station devices in the existing communication system and the interference coordination principle. In step S1203, the electronic device 1000 of the to-be-added communication system simulates a position distribution based on the information of all the base station devices in the to-be-added communication system and the information of the base station devices in the existing communication system. In step S1204, the electronic device 1000 of the to-be-added communication system performs coordination on interference between the base station devices in the to-be-added communication system and the base station devices in the existing communication system according to a predetermined interference coordination principle. In step S1205, the electronic device 1000 of the to-be-added communication system calculates a first system performance of the to-be-added communication system. Alternatively, the electronic device 1000 of the to-be-added communication system may further calculate a second system performance of the to-be-added communication system. Next, in step S1206, the electronic device 1000 of the to-be-added communication system determines whether to add the to-be-added communication system to the CxM. In step S1207, the electronic device 1000 of the to-be-added communication system transmits decision information indicating whether to add the to-be-added communication system to the CxM. In step S1208, the CxM simulates a location distribution based on the information of all base station devices in the to-be-added communication system and the information of the base station devices in the existing communication system. In step S1209, the CxM performs coordination on the interference between the base station devices in the to-be-added communication system and the base station devices in the existing communication system according to a predetermined interference coordination principle. In step S1210, the CxM calculates a third system performance of the existing communication system. Alternatively, the CxM may further calculate a fourth system performance of the existing communication system. Next, in step S1211, the CxM transmits the system performance to respective existing communication systems. Next, in step S1212, the electronic device that manages the existing communication systems determines whether to agree to add the to-be-added communication system to the spectrum management device. Next, in step S1213, the electronic device that manages the existing communication systems transmits, to the CxM, decision information indicating whether to agree to add the to-be-added communication system to the CxM. Next, in step S1214, the CxM determines whether to perform spectrum management on the to-be-added communication system based on the decision information from the existing communication system and the decision information from the to-be-added communication system. Next, in step S1215, the CxM transmits, to the electronic device that manages the to-be-added communication system, an acceptance notice indicating that the to-be-added communication system is agreed to be added to the spectrum management device or a rejection notice indicating that the to-be-added communication system is rejected to be added to the spectrum management device.

As described above, according to the embodiments of the present disclosure, the electronic device that manages the to-be-added communication system may determine the system performance of the to-be-added communication system;

the spectrum management device may determine the system performance of the existing communication system; and the spectrum management device may determine, based on both the decision information from the existing communication system and the decision information from the to-be-added communication system, whether to agree to perform spectrum management on the to-be-added communication system. According to the embodiments of the present disclosure, the spectrum management device may determine the system performance of the existing communication system only in a case where the to-be-added communication system agrees to be added to the spectrum management device. Alternatively, the spectrum management device may determine the system performance of the existing communication system after the deployment request from the to-be-added communication system is received, regardless of whether the to-be-added communication system agrees to be added to the spectrum management device.

Figure 13:
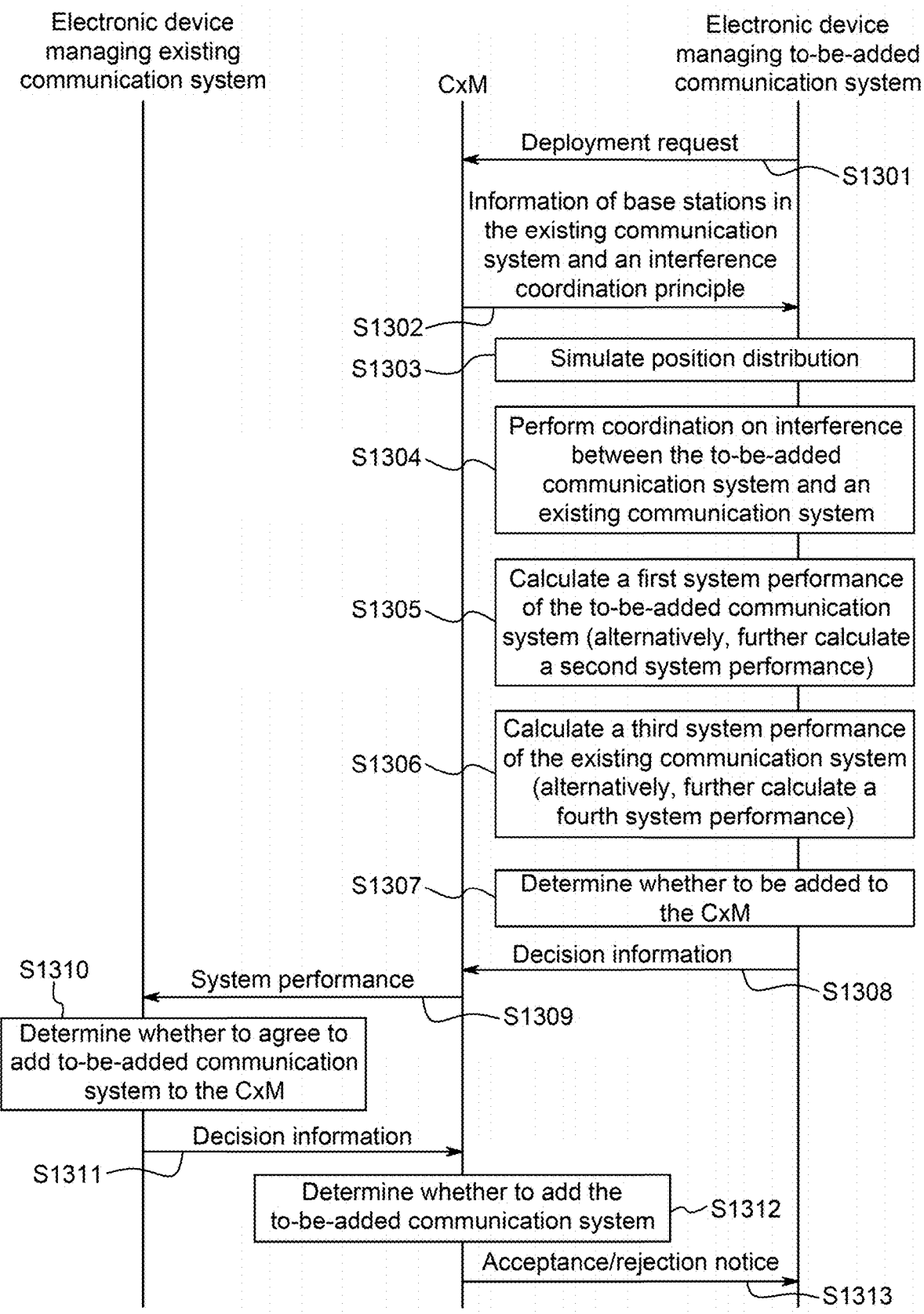
FIG. 13 is a signaling flowchart for determining whether to perform, by a spectrum management device, spectrum management on a to-be-added communication system according to an embodiment of the present disclosure.

FIG. 13 is a signaling flowchart for determining whether to perform, by a spectrum management device, spectrum management on a to-be-added communication system according to an embodiment of the present disclosure. In FIG. 13, the CxM may be implemented by the spectrum management device 200, and the electronic device that manages the to-be-added communication system may be implemented by the electronic device 1000. As shown in FIG. 13, in step S1301, the electronic device that manages the to-be-added communication system transmits, to the CxM, a deployment request to request for information of base station devices of the existing communication system and an interference coordination principle. In step S1302, the CxM transmits the information of base station devices in the existing communication system and the interference coordination principle to the electronic device 1000 that manages the to-be-added communication system. In step S1303, the electronic device 1000 of the to-be-added communication system simulates a position distribution based on information of all base station devices in the to-be-added communication system and the information of base station devices in the existing communication system. In step S1304, the electronic device 1000 of the to-be-added communication system performs coordination on interference between the base station devices in the to-be-added communication system and the base station devices in the existing communication system according to a predetermined interference coordination principle. In step S1305, the electronic device 1000 of the to-be-added communication system calculates a first system performance of the to-be-added communication system. Alternatively, the electronic device 1000 of the to-be-added communication system may further calculate a second system performance of the to-be-added communication system. In step S1306, the electronic device 1000 of the to-be-added communication system calculates a third system performance of respective existing communication systems. Alternatively, the electronic device 1000 of the to-be-added communication system may further calculate a fourth system performance of respective existing communication systems. Next, in step S1307, the electronic device 1000 of the to-be-added communication system determines whether to add the to-be-added communication system to the CxM. In step S1308, the electronic device 1000 of the to-be-added communication system transmits, to the CxM, decision information indicating whether to add the to-be-added communication system to the CxM and the system performance of respective existing communication systems. Next, in step S1309, the CxM transmits the system performance of respective existing communication systems to respective existing communication systems. Next, in step S1310, the electronic device that manages the existing communication system determines whether to agree to add the to-be-added communication system to the spectrum management device. Next, in step S1311, the electronic device that manages the existing communication system transmits, to the CxM, decision information indicating whether to agree to add the to-be-added communication system to the CxM. Next, in step S1312, the CxM determines whether to perform spectrum management on the to-be-added communication system based on the decision information from the existing communication system and the decision information from the to-be-added communication system. Next, in step S1313, the CxM transmits, to the electronic device that manages the to-be-added communication system, an acceptance notice indicating that the to-be-added communication system is agreed to be added to the spectrum management device or a rejection notice indicating that the to-be-added communication system is rejected to be added to the spectrum management device.

As described above, according to the embodiments of the present disclosure, the system performance of the to-be-added communication system and the system performance of respective existing communication systems may be determined by the electronic device that manages the to-be-added communication system; and the spectrum management device may determine, based on both the decision information from the existing communication system and the decision information from the to-be-added communication system, whether to agree to perform spectrum management on the to-be-added communication system.

4. Method Embodiments

A wireless communication method performed by the spectrum management device 200 in a wireless communication system according to an embodiment of the present disclosure is described in detail below.

Figure 14:
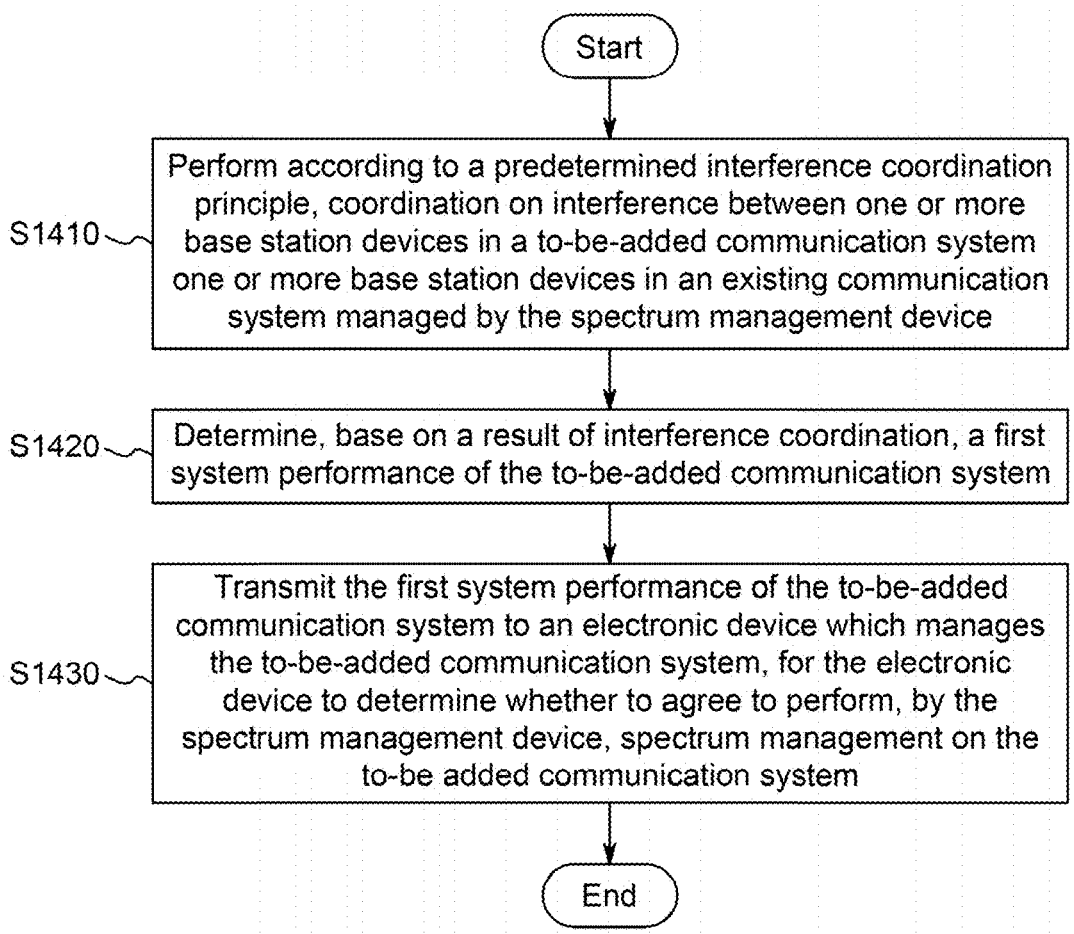
FIG. 14 is a flowchart showing a wireless communication method performed by a spectrum management device according to an embodiment of the present disclosure.

FIG. 14 is a flowchart showing a wireless communication method performed by the spectrum management device 200 in a wireless communication system according to an embodiment of the present disclosure.

As shown in FIG. 14, in step S1410, coordination is performed, according to a predetermined interference coordination principle, on interference between one or more base station devices in a to-be-added communication system and one or more base station devices in an existing communication system managed by the spectrum management device.

Next, in step S1420, a first system performance of the to-be-added communication system is determined based on a result of interference coordination.

Next, in step S1430, the first system performance of the to-be-added communication system is transmitted to an electronic device that manages the to-be-added communication system, for the electronic device to determine whether to agree to perform, by the spectrum management device, spectrum management on the to-be-added communication system.

In a preferred embodiment, the wireless communication method further includes: receiving, from the electronic device, information of the one or more base station devices in the to-be-added communication system; simulating, based on the information, a position distribution of the one or more base station devices in the to-be-added communication system; and performing interference coordination based on the position distribution.

In a preferred embodiment, the information of the one or more base station devices in the to-be-added communication system includes: the number of base station devices in the to-be-added communication system, uplink and downlink configuration of sub-frames of each of the base station devices, and a maximum transmission power of each of the base station devices.

In a preferred embodiment, the information of the one or more base station devices in the to-be-added communication system further includes position distribution information of the one or more base station devices in the to-be-added communication system.

In a preferred embodiment, the predetermined interference coordination principle includes: adjusting, with respect to a base station device in the existing communication system which generates interference to any of the base station devices in the to-be-added communication system, uplink and downlink configuration of sub-frames of the base station device to reduce interference, or prohibiting the base station device from performing uplink and downlink transmissions; and/or adjusting, with respect to a base station device in the to-be-added communication system which generates interference to any of the base station devices in the existing communication system, uplink and downlink configuration of sub-frames of the base station device to reduce interference, or prohibiting the base station device from performing uplink and downlink transmissions.

In a preferred embodiment, the wireless communication method further includes: determining the first system performance based on the number of base station devices whose uplink and downlink configuration of sub-frames is adjusted or whose uplink and downlink transmissions are prohibited in the to-be-added communication system, and/or interference suffered by respective base station devices in the to-be-added communication system after the interference coordination is performed.

In a preferred embodiment, the wireless communication method further includes: determining a second system performance of the to-be-added communication system in a case where no interference coordination is performed; and transmitting the second system performance of the to-be-added communication system to the electronic device, for the electronic device to determine whether to agree to perform, by the spectrum management device, spectrum management on the to-be-added communication system.

In a preferred embodiment, the wireless communication method further includes: determining the second system performance based on interference suffered by respective base station devices in the to-be-added communication system in a case where no interference coordination is performed.

In a preferred embodiment, the wireless communication method further includes: determining, based on a result of interference coordination, third system performances of respective existing communication systems managed by the spectrum management device; and respectively transmitting the third system performances of the respective existing communication systems to respective electronic devices which manage the respective existing communication systems, for the respective electronic devices to determine whether to agree to perform, by the spectrum management device, spectrum management on the to-be-added communication system.

In a preferred embodiment, the wireless communication method further includes: determining the third system performance of the existing communication system based on the number of the base station devices whose uplink and downlink configuration of sub-frames is adjusted or whose uplink and downlink transmissions are prohibited in the existing communication system, and/or interference suffered by respective base station devices in the existing communication system after the interference coordination is performed.

In a preferred embodiment, the wireless communication method further includes: determine fourth system performances of respective existing communication systems managed by the spectrum management device in a case where no interference coordination is performed; and respectively transmit the fourth system performances of respective existing communication systems to respective electronic devices that manage the respective existing communication systems, for the respective electronic devices to determine whether to agree to perform, by the spectrum management device, spectrum management on the to-be-added communication system.

In a preferred embodiment, the wireless communication method further includes: determining the fourth system performance of the existing communication system based on interference suffered by respective base station devices in the existing communication system in a case where no interference coordination is performed In a preferred embodiment, the wireless communication method further includes: receiving, from the electronic device that manages the to-be-added communication system, first decision information indicating whether to agree to perform, by the spectrum management device, spectrum management on the to-be-added communication system; receiving, from the respective electronic devices that manage the respective existing communication systems, second decision information indicating whether to agree to perform, by the spectrum management device, spectrum management on the to-be-added communication system; and determining, based on the first decision information and the second decision information, whether to agree to perform, by the spectrum management device, spectrum management on the to-be-added communication system.

According to an embodiment of the present disclosure, a subject that performs the above-mentioned method may be the spectrum management device 200 according to the embodiments of the present disclosure, and therefore all the foregoing embodiments of the spectrum management device 200 are applicable thereto.

A wireless communication method performed by the electronic device 1000 in a wireless communication system according to an embodiment of the present disclosure is described in detail below.

Figure 15:
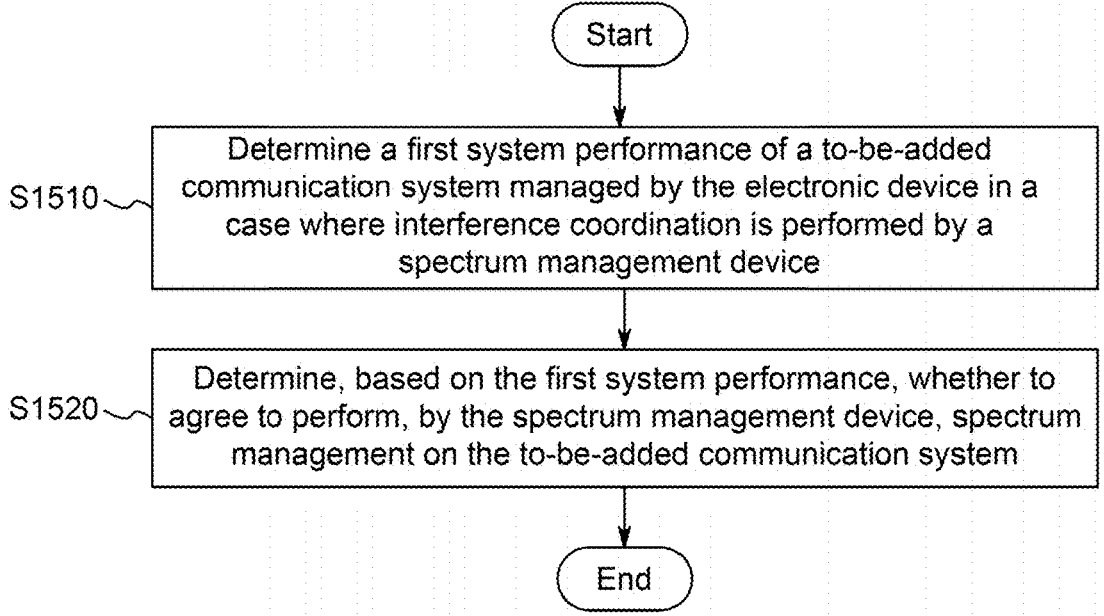
FIG. 15 is a flowchart showing a wireless communication method performed by an electronic device according to an embodiment of the present disclosure.

FIG. 15 is a flowchart showing a wireless communication method performed by the electronic device 1000 in a wireless communication system according to an embodiment of the present disclosure.

As shown in FIG. 15, in step S1510, a first system performance of a to-be-added communication system managed by the electronic device 1000 in a case where interference coordination is performed by the spectrum management device is determined.

In step S1520, it is determined, based on the first system performance, whether to agree to perform, by the spectrum management device, spectrum management on the to-be-added communication system.

The interference coordination includes: performing, according to a predetermined interference coordination principle, coordination on interference between one or more base station devices in the to-be-added communication system and one or more base station devices in an existing communication system managed by the spectrum management device.

In a preferred embodiment, the wireless communication method further includes: transmitting, to the spectrum management device, information of the one or more base station devices in the to-be-added communication system; and receiving, from the spectrum management device, the first system performance of the to-be-added communication system determined based on the information of the one or more base station devices in the to-be-added communication system.

In a preferred embodiment, the information of the one or more base station devices in the to-be-added communication system includes: the number of base station devices in the to-be-added communication system, uplink and downlink configuration of sub-frames each of the base station devices, and a maximum transmission power of each of the base station devices.

In a preferred embodiment, the information of the one or more base station devices in the to-be-added communication system further includes position distribution information of the one or more base station devices in the to-be-added communication system.

In a preferred embodiment, the wireless communication method further includes: determining, based on the first system performance, the number of base station devices whose uplink and downlink configuration of sub-frames is adjusted or whose uplink and downlink transmissions are prohibited in the to-be-added communication system, and/or interference suffered by respective base station devices in the to-be-added communication system in a case where the interference coordination is performed by the spectrum management device.

In a preferred embodiment, the wireless communication method further includes: receiving, from the spectrum management device, a second system performance of the to-be-added communication system in a case where no interference coordination is performed by the spectrum management device; and determining, based on the second system performance, whether to agree to perform, by the spectrum management device, spectrum management on the to-be-added communication system.

In a preferred embodiment, the wireless communication method further includes: determining, based on the second system performance, the interference suffered by respective base station devices in the to-be-added communication system in a case where no interference coordination is performed by the spectrum management device.

In a preferred embodiment, the wireless communication method further includes: receiving, from the spectrum management device, information of one or more base station devices in respective existing communication systems managed by the spectrum management device and an interference coordination principle; and determining the first system performance of the to-be-added communication system based on the information of one or more base station devices in respective existing communication systems, information of the one or more base station devices in the to-be-added communication system, and the interference coordination principle.

In a preferred embodiment, the wireless communication method further includes: simulating a position distribution of the one or more base station devices in the to-be-added communication system based on the information of the one or more base station devices in the to-be-added communication system; performing interference coordination based on the position distribution; and determining the first system performance of the to-be-added communication system based on a result of the interference coordination.

In a preferred embodiment, the interference coordination principle includes: adjusting, with respect to a base station device in the existing communication system which generates interference to any of the base station devices in the to-be-added communication system, uplink and downlink configuration of sub-frames of the base station device to reduce interference, or prohibiting the base station device from performing uplink and downlink transmissions; and/or adjusting, with respect to a base station device in the to-be-added communication system which generates interference to any of the base station devices in the existing communication system, uplink and downlink configuration of sub-frames of the base station device to reduce interference, or prohibiting the base station device from performing uplink and downlink transmissions.

In a preferred embodiment, the wireless communication method further includes: determining the first system performance based on the number of base station devices whose uplink and downlink configuration of sub-frames is adjusted or whose uplink and downlink transmissions are prohibited in the to-be-added communication system, and/or interference suffered by respective base station devices in the to-be-added communication system after the interference coordination is performed.

In a preferred embodiment, the wireless communication method further includes: determining a second system performance of the to-be-added communication system in a case where no interference coordination is performed by the spectrum management device; and determining, based on the second system performance, whether to agree to perform, by the spectrum management device, spectrum management on the to-be-added communication system.

In a preferred embodiment, the wireless communication method further includes: determining the second system performance based on interference suffered by respective base station devices in the to-be-added communication system in a case where no interference coordination is performed by the spectrum management device.

In a preferred embodiment, the wireless communication method further includes: transmitting, to the spectrum management device, decision information indicating whether to agree to perform, by the spectrum management device, spectrum management on the to-be-added communication system.

According to an embodiment of the present disclosure, a subject that performs the above method may be the electronic device 1000 according to the embodiments of the present disclosure, and therefore all the foregoing embodiments of the electronic device 1000 are applicable thereto.

7. Application Examples

The technology of the present disclosure may be applied to various products.

The spectrum management device 200 may be implemented as any type of server, such as a tower server, a rack server, and a blade server. The spectrum management device 200 may be a control module mounted on a server (such as an integrated circuitry module including a single die, and a card or blade inserted into a slot of a blade server).

The network side device may also be implemented as any type of base station device, such as a macro eNB and a small eNB, and may also be implemented as any type of gNB (a base station in a 5G system). The small eNB may be an eNB covering a cell smaller than a macro cell, such as a pico eNB, a micro eNB, and a home (femto) eNB. Instead, the base station may be implemented as any other type of base station, such as a NodeB and a base transceiver station (BTS). The base station may include: a main body (which is also referred to as a base station device) configured to control wireless communication; and one or more remote wireless head ends (RRHs) that are arranged in different places from the main body.

Application Example of a Server

Figure 16:
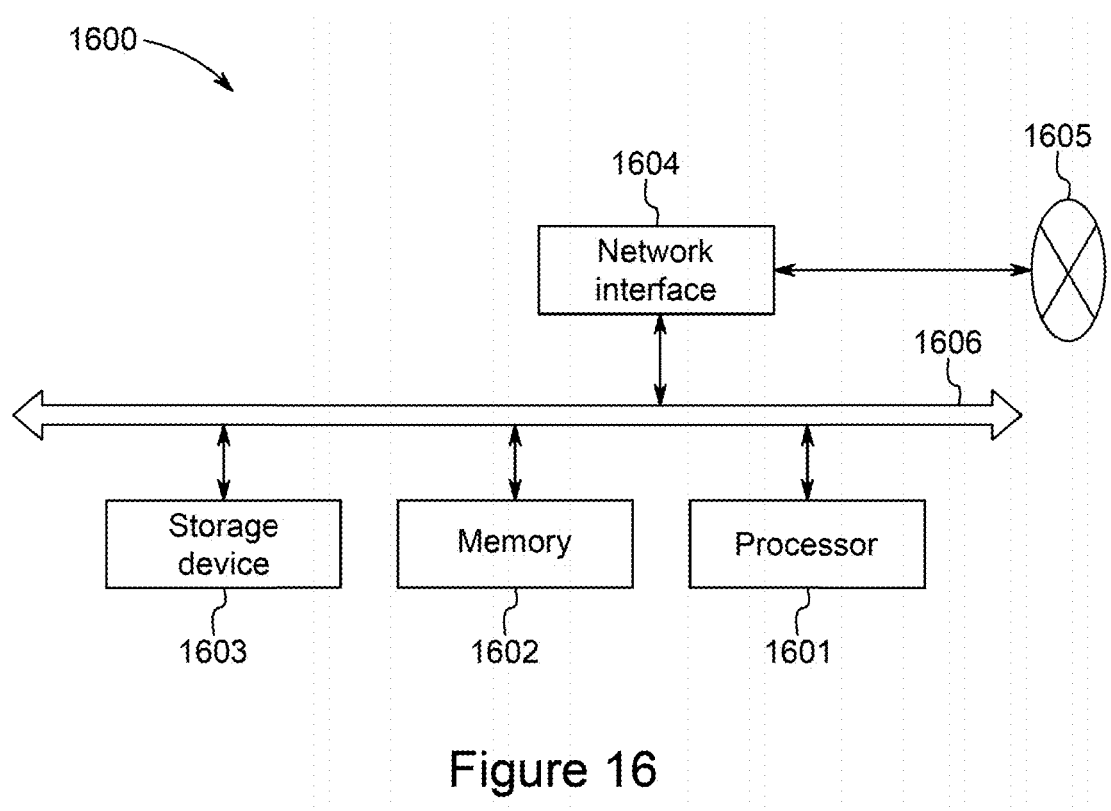
FIG. 16 is a block diagram showing an example of a server that may implement the spectrum management device according to the present disclosure.

FIG. 16 is a block diagram of an example of a server 1600 that may implement the spectrum management device according to the present disclosure. The server 1600 includes a processor 1601, a memory 1602, a storage device 1603, a network interface 1604, and a bus 1606.

The processor 1601 may be, for example, a central processing unit (CPU) or a digital signal processor (DSP), and controls functions of the server 1600. The memory 1602 includes a random access memory (RAM) and a read-only memory (ROM), and stores data and a program executed by the processor 1601. The storage 1603 may include a storage medium, such as a semiconductor memory and a hard disk.

The network interface 1604 is a wired communication interface for connecting the server 1600 to a wired communication network 1605. The wired communication network 1605 may be a core network such as an Evolved Packet Core (EPC), or a packet data network (PDN) such as the Internet.

The bus 1606 connects the processor 1601, the memory 1602, the storage device 1603, and the network interface 1604 to each other. The bus 1606 may include two or more buses having different speeds (such as a high-speed bus and a low-speed bus).

In the server 1600 shown in FIG. 16, the interference coordination unit 210, the performance determining unit 220, the decision making unit 240 and the spectrum management unit 250 described with reference to FIG. 2 may be implemented by the processor 1601, and the communication unit 230 described with reference to FIG. 2 may be implemented by the network interface 1604. For example, the processor 1601 may perform functions of performing interference coordination, determining a system performance of a communication system, determining whether to perform spectrum management on a to-be-added communication system, and performing spectrum management on communication systems, by executing instructions stored in the memory 1602 or storage device 1603.

Application Example of a Base Station

First Application Example

Figure 17:
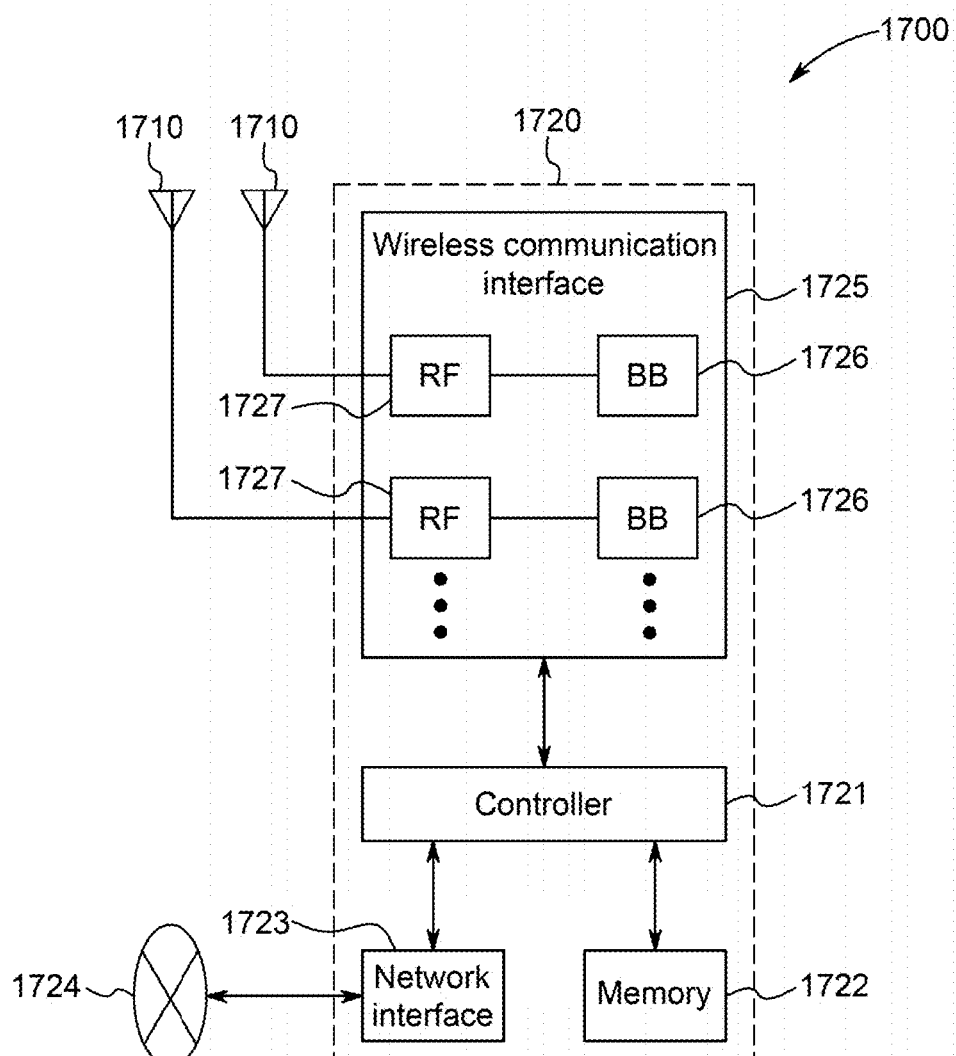
FIG. 17 is a block diagram showing a first example of a schematic configuration of an eNB (Evolved Node B)

FIG. 17 is a block diagram showing a first example of a schematic configuration of an eNB to which the technique of the present disclosure may be applied. The eNB 1700 includes a single or multiple antennas 1710 and a base station device 1720. The base station device 1720 and each of the antennas 1710 may be connected to each other via a RF cable.

Each of the antennas 1710 includes a single or multiple antenna elements (such as multiple antenna elements included in a multiple-input multiple-output (MIMO) antenna), and are used for transmitting and receiving wireless signals by the base station device 1720. The eNB 1700 may include multiple antennas 1710, as shown in FIG. 17. For example, the multiple antennas 1710 may be compatible with multiple frequency bands used by the eNB 1700. Although FIG. 17 shows an example in which the eNB 1700 includes the multiple antennas 1710, the eNB 1700 may also include a single antenna 1710.

The base station device 1720 includes a controller 1721, a memory 1722, a network interface 1723, and a wireless communication interface 1725.

The controller 1721 may be, for example, a CPU or a DSP, and operates various functions of a higher layer of the base station device 1720. For example, the controller 1721 generates a data packet based on data in a signal processed by the wireless communication interface 1725, and transfers the generated packet via the network interface 1723. The controller 1721 may bundle data from multiple baseband processors to generate bundled packet, and transfer the generated bundled packet. The controller 1721 may have logical functions of performing control such as radio resource control, radio bearer control, mobility management, admission control, and scheduling. The control may be performed in conjunction with an adjacent eNB or a core network node. The memory 1722 includes RAM and ROM, and stores a program that is executed by the controller 1721, and various types of control data (such as a terminal list, transmitting power data, and scheduling data).

The network interface 1723 is a communication interface for connecting the base station device 1720 to a core network 1724. The controller 1721 may communicate with a core network node or another eNB via the network interface 1723. In that case, the eNB 1700, and the core network node or the other eNB may be connected to each other through a logical interface (such as an S1 interface and an X2 interface). The network interface 1723 may be a wired communication interface or a wireless communication interface for a wireless backhaul line. If the network interface 1723 is a wireless communication interface, the network interface 1723 may use a higher frequency band for wireless communication than a frequency band used by the wireless communication interface 1725.

The wireless communication interface 1725 supports any cellular communication scheme (such as Long Term Evolution (LTE) and LTE-Advanced), and provides wireless connection to a terminal positioned in a cell of the eNB 1700 via the antenna 1710. The wireless communication interface 1725 may typically include, for example, a baseband (BB) processor 1726 and an RF circuit 1727. The BB processor 1726 may perform, for example, coding/decoding, modulation/demodulation and multiplexing/de-multiplexing, and perform various types of signal processes of the layer (for example L1, media access control (MAC), radio link control (RLC) and packet data convergence protocol (PDCP)). Instead of the controller 1721, the BB processor 1726 may have a part or all of the above logical functions. The BB processor 1726 may be a memory storing communication control programs, or a module including a processor and a related circuit which are configured to execute the programs. Updating the program may allow the functions of the BB processor 1726 to be changed. The module may be a card or a blade that is inserted into a slot of the base station device 1720. Alternatively, the module may be a chip that is mounted on the card or the blade. In addition, the RF circuit 1727 may include, for example, a frequency mixer, a filter or an amplifier, and transmits and receives wireless signals via the antenna 1710.

As shown in FIG. 17, the wireless communication interface 1725 may include multiple BB processors 1726. For example, the multiple BB processors 1726 may be compatible with multiple frequency bands used by the eNB 1700.

As shown in FIG. 17, the wireless communication interface 1725 may include multiple RF circuits 1727. For example, the multiple RF circuits 1727 may be compatible with multiple antenna elements. Although FIG. 17 shows an example in which the wireless communication interface 1725 includes multiple BB processors 1726 and multiple RF circuits 1727, the wireless communication interface 1725 may include a single BB processor 1726 and a single RF circuit 1727.

Second Application Example

Figure 18:
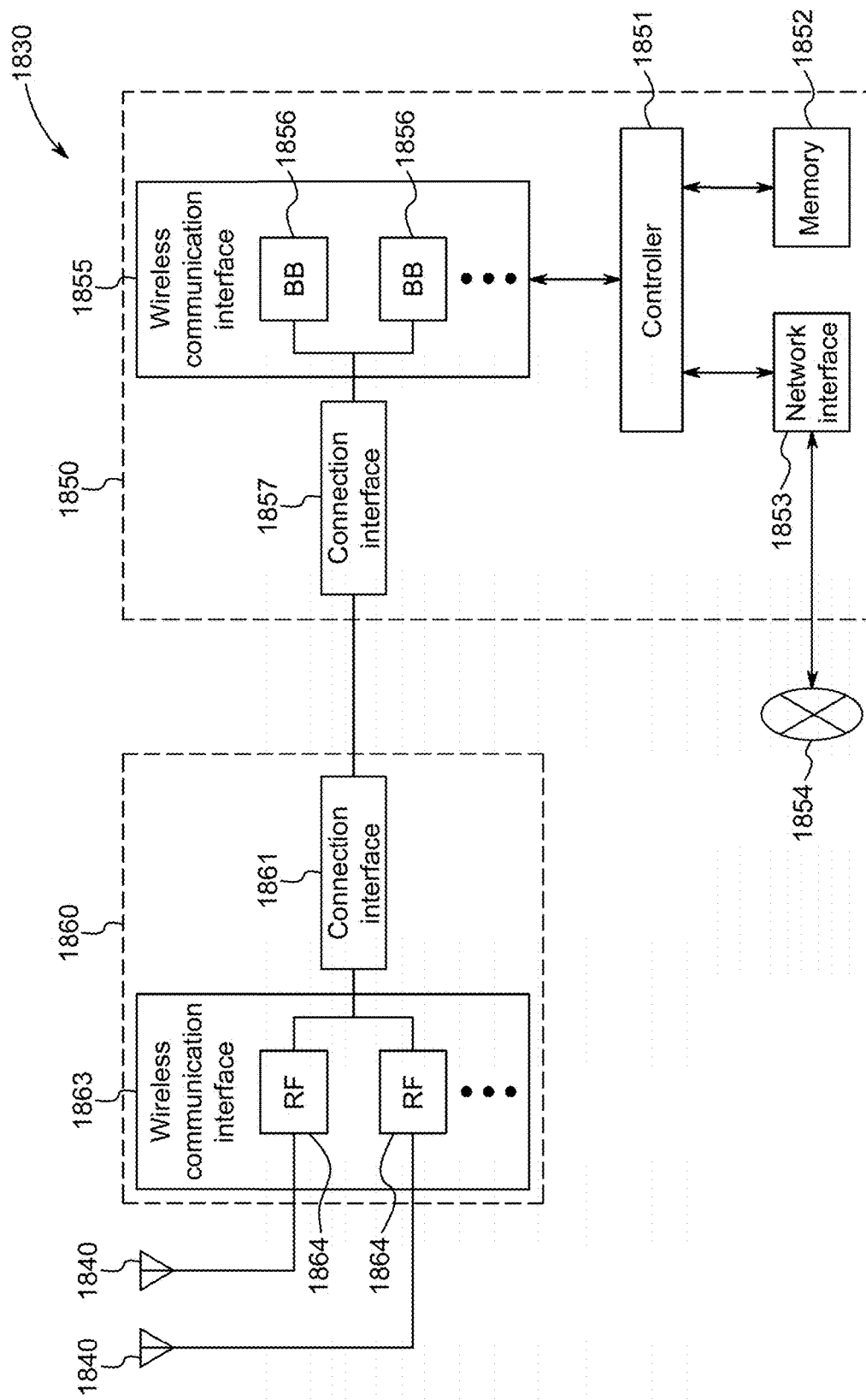
FIG. 18 is a block diagram showing a second example of a schematic configuration of an eNB.

FIG. 18 is a block diagram showing a second example of a schematic configuration of an eNB to which the technique of the present disclosure may be applied. An eNB 1830 includes a single or multiple antennas 1840, a base station device 1850 and an RRH 1860. Each antenna 1840 and the RRH 1860 may be connected to each other via an RF cable. The base station device 1850 and the RRH 1860 may be connected to each other via a high-speed line such as a fiber cable.

Each of the antennas 1840 includes a single or multiple antennal elements (such as multiple antenna elements included in a multiple-input multiple-output (MIMO) antenna), and is used for the RRH 1860 to transmit and receive wireless signals. As shown in FIG. 18, the eNB 1830 may include multiple antennas 1840. For example, the multiple antennas 1840 may be compatible with multiple frequency bands used by the eNB 1830. Although FIG. 18 shows an example that the eNB 1830 includes multiple antennas 1840, the eNB 1830 may also include a single antenna 1840.

The base station device 1850 includes a controller 1851, a memory 1852, a network interface 1853, a wireless communication interface 1855, and a connection interface 1857. The controller 1851, the memory 1852, and the network interface 1853 are the same as the controller 1721, the memory 1722, and the network interface 1723 described with reference to FIG. 17.

The wireless communication interface 1855 supports any cellular communication solution (such as LTE and LTE-advanced), and provides wireless communication with a terminal located in a sector corresponding to the RRH 1860 via the RRH 1860 and the antenna 1840. The wireless communication interface 1855 may typically include, for example, a BB processor 1856. Other than connecting to an RF circuit 1864 of the RRH 1860 via the connection interface 1857, the BB processor 1856 is the same as the BB processor 1726 described with reference to FIG. 17. As show in FIG. 18, the wireless communication interface 1855 may include multiple BB processors 1856. For example, the multiple BB processors 1856 may be compatible with the multiple frequency bands used by the eNB 1830. Although FIG. 18 shows an example in which the wireless communication interface 1855 includes multiple BB processors 1856, the wireless communication interface 1855 may also include a single BB processor 1856.

The connection interface 1857 is an interface for connecting the base station device 1850 (the wireless communication interface 1855) to the RRH 1860. The connection interface 1857 may also be a communication module to connect the base station device 1850 (the wireless communication interface 1855) to the RRH 1860 for communication in the above high-speed line.

The RRH 1860 includes a connection interface 1861 and a wireless communication interface 1863.

The connection interface 1861 is an interface for connecting the RRH 1860 (the wireless communication interface 1863) to the base station device 1850. The connection interface 1861 may also be a communication module for the communication in the above high-speed line.

The wireless communication interface 1863 transmits and receives wireless signals via the antenna 1840. The wireless communication interface 1863 may typically include, for example, the RF circuit 1864. The RF circuit 1864 may include, for example, a frequency mixer, a filter and an amplifier, and transmits and receives wireless signals via the antenna 1840. The wireless communication interface 1863 may include multiple RF circuits 1864, as shown in FIG. 18. For example, the multiple RF circuits 1864 may support multiple antenna elements. Although FIG. 18 shows the example in which the wireless communication interface 1863 includes the multiple RF circuits 1864, the wireless communication interface 1863 may include a single RF circuit 1864.

In the eNB 1700 shown in FIG. 17 and the eNB 1830 shown in FIG. 18, the performance determining unit 1010, the determination unit 1020 and the interference coordination unit 1040 described with reference to FIG. 10 may be implemented by the controller 1721 and/or the controller 1851. The communication unit 1030 described with reference to FIG. 10 may be implemented by the wireless communication interface 1725 and the wireless communication interface 1855 and/or the wireless communication unit 1863. At least a part of the functions may be implemented by the controller 1721 and the controller 1851. For example, the controller 1721 and/or the controller 1851 may perform the functions of determining a system performance of a communication system, determining whether to perform spectrum management by the spectrum management device on the communication system, and performing interference coordination, by executing instructions stored in the corresponding memory.

The preferred embodiments of the present disclosure are described above with reference to the drawings, but the present disclosure is not limited to the above examples. Those skilled in the art may make various alternations and modifications within the scope of the claims, and it should be understood that these alternations and modifications shall naturally fall within the technical scope of the present disclosure.

For example, units shown by dashed boxes in the functional block diagram shown in the drawings all indicate that the functional unit is optional in the corresponding device, and each optional functional unit may be combined in an appropriate manner to achieve a desired function.

For example, multiple functions included in one unit in the above embodiments may be implemented by separate devices. Alternatively, multiple functions implemented by multiple units in the above embodiments may be implemented by separate devices, respectively. In addition, one of the above functions may be implemented by multiple units. Further, such a configuration is included in the technical scope of the present disclosure.

In this specification, the steps described in the flowchart include not only processes performed in time series in the order described, but also processes performed in parallel or individually instead of having to be performed in time series. Further, even in the steps processed in a time series, the order can be appropriately changed.

Although the embodiments of the present disclosure have been described above in detail in connection with the drawings, it is appreciated that the embodiments as described above are merely illustrative but not limitative of the present disclosure. Those skilled in the art may make various modifications and variations to the above embodiments without departing from the spirit and scope of the disclosure. Therefore, the scope of the disclosure is defined merely by the appended claims and their equivalents.

The invention claimed is:

1. A spectrum management device, comprising processing circuitry configured to:
   perform, according to a predetermined interference coordination principle, coordination on interference between one or more base station devices in a to-be-added communication system and one or more base station devices in an existing communication system managed by the spectrum management device;
   determine, based on a result of interference coordination, a coordinated system performance of the to-be-added communication system; and
   transmit the coordinated system performance of the to-be-added communication system to an electronic device which manages the to-be-added communication system, for the electronic device to determine whether to agree to perform, by the spectrum management device, spectrum management on the to-be-added communication system.

2. The spectrum management device according to claim 1, wherein the processing circuitry is further configured to:
   receive, from the electronic device, information of the one or more base station devices in the to-be-added communication system;
   simulate, based on the information, a position distribution of the one or more base station devices in the to-be-added communication system; and
   perform interference coordination based on the position distribution.

3. The spectrum management device according to claim 1, wherein the predetermined interference coordination principle comprises:
   adjusting, with respect to a base station device in the existing communication system which generates interference to any of the base station devices in the to-be-added communication system, uplink and downlink configuration of sub-frames of the base station device to reduce interference, or prohibiting the base station device from performing uplink and downlink transmissions; or
   adjusting, with respect to a base station device in the to-be-added communication system which generates interference to any of the base station devices in the existing communication system, uplink and downlink configuration of sub-frames of the base station device to reduce interference, or prohibiting the base station device from performing uplink and downlink transmissions.

4. The spectrum management device according to claim 3, wherein the processing circuitry is further configured to:
   determine the coordinated system performance based on a number of the base station devices whose uplink and downlink configuration of a sub-frame is adjusted or whose uplink and downlink transmissions are prohibited in the to-be-added communication system, or interference suffered by respective base station devices in the to-be-added communication system after the interference coordination is performed.

5. The spectrum management device according to claim 1, wherein the processing circuitry is further configured to:
   determine a non-coordinated system performance of the to-be-added communication system in a case where no interference coordination is performed; and
   transmit the non-coordinated system performance of the to-be-added communication system to the electronic device, for the electronic device to determine whether to agree to perform, by the spectrum management device, spectrum management on the to-be-added communication system.

6. The spectrum management device according to claim 3, wherein the processing circuitry is further configured to:
   determine, based on a result of interference coordination, coordinated system performances of respective existing communication systems managed by the spectrum management device; and
   respectively transmit the coordinated system performances of the respective existing communication systems to respective electronic devices which manage the respective existing communication systems, for the respective electronic devices to determine whether to agree to perform, by the spectrum management device, spectrum management on the to-be-added communication system.

7. The spectrum management device according to claim 6, wherein the processing circuitry is further configured to:
   determine the coordinated system performance of the existing communication system based on a number of the base station devices whose uplink and downlink configuration of a sub-frame is adjusted or whose uplink and downlink transmissions are prohibited in the existing communication system, or interference suffered by respective base station devices in the existing communication system after the interference coordination is performed.

8. The spectrum management device according to claim 6, wherein the processing circuit is further configured to:
   determine the non-coordinated system performances of respective existing communication systems managed by the spectrum management device in a case where no interference coordination is performed; and
   respectively transmit the non-coordinated system performances of respective existing communication systems to respective electronic devices that manage the respective existing communication systems, for the respective electronic devices to determine whether to agree to perform, by the spectrum management device, spectrum management on the to-be-added communication system.

9. The spectrum management device according to claim 6, wherein the processing circuit is further configured to:
   receive, from the electronic device that manages the to-be-added communication system, decision information indicating whether to agree to perform, by the spectrum management device, spectrum management on the to-be-added communication system;
   receive, from the respective electronic devices that manage the respective existing communication systems, decision information indicating whether to agree to perform, by the spectrum management device, spectrum management on the to-be-added communication system; and
   determine whether to agree to perform, by the spectrum management device, spectrum management on the to-be-added communication system based on the decision information from the electronic device that manages the to-be-added communication system and the decision information from the respective electronic devices that manage the respective existing communication system.

10. An electronic device, comprising processing circuitry configured to:
    determine a coordinated system performance of a to-be-added communication system managed by the electronic device in a case where interference coordination is performed by a spectrum management device; and
    determine, based on the coordinated system performance, whether to agree to perform, by the spectrum management device, spectrum management on the to-be-added communication system,
    wherein the interference coordination comprises: performing, according to a predetermined interference coordination principle, coordination on interference between one or more base station devices in the to-be-added communication system and one or more base station devices in an existing communication system managed by the spectrum management device.

11. The electronic device according to claim 10, wherein the processing circuitry is further configured to:
    transmit, to the spectrum management device, information of the one or more base station devices in the to-be-added communication system; and
    receive, from the spectrum management device, the coordinated system performance of the to-be-added communication system determined based on the information of the one or more base station devices in the to-be-added communication system.

12. The electronic device according to claim 11, wherein the processing circuitry is further configured to:
    determine, based on the coordinated system performance, a number of the base station devices whose uplink and downlink configuration of a sub-frame is adjusted or whose uplink and downlink transmissions are prohibited in the to-be-added communication system, or interference suffered by respective base station devices in the to-be-added communication system in a case where interference coordination is performed by the spectrum management device.

13. The electronic device according to claim 11, wherein the processing circuitry is further configured to:
    receive, from the spectrum management device, a non-coordinated system performance of the to-be-added communication system in a case where no interference coordination is performed by the spectrum management device; and
    determine, based on the non-coordinated system performance, whether to agree to perform, by the spectrum management device, spectrum management on the to-be-added communication system.

14. The electronic device according to claim 13, wherein the processing circuitry is further configured to:
    determine, based on the non-coordinated system performance, the interference suffered by respective base station devices in the to-be-added communication system in a case where no interference coordination is performed by the spectrum management device.

15. The electronic device according to claim 10, wherein the processing circuitry is further configured to:
    receive, from the spectrum management device, information of one or more base station devices in respective existing communication systems managed by the spectrum management device and an interference coordination principle; and
    determine the coordinated system performance of the to-be-added communication system based on information of one or more base station devices in respective existing communication systems, the information of the one or more base station devices in the to-be-added communication system, and the interference coordination principle.

16. The electronic device according to claim 15, wherein the processing circuitry is further configured to:
    simulate a position distribution of the one or more base station devices in the to-be-added communication system based on the information of the one or more base station devices in the to-be-added communication system;
    perform interference coordination based on the position distribution; and
    determine the coordinated system performance of the to-be-added communication system based on a result of the interference coordination.

17. The electronic device according to claim 16, wherein the interference coordination principle comprises:
    adjusting, with respect to a base station device in the existing communication system which generates interference to any of the base station devices in the to-be-added communication system, uplink and downlink configuration of sub-frames of the base station device to reduce interference, or prohibiting the base station device from performing uplink and downlink transmissions; and/or
    adjusting, with respect to a base station device in the to-be-added communication system which generates interference to any of the base station devices in the existing communication system, uplink and downlink configuration of sub-frames of the base station device to reduce interference, or prohibiting the base station device from performing uplink and downlink transmissions.

18. The electronic device according to claim 17, wherein the processing circuitry is further configured to:
    determine the coordinated system performance based on a number of the base station devices whose uplink and downlink configuration of a sub-frame is adjusted or whose uplink and downlink transmissions are prohibited in the to-be-added communication system, or interference suffered by respective base station devices in the to-be-added communication system after the interference coordination is performed.

19. The electronic device of claim 15, wherein the processing circuitry is further configured to:
    determine a non-coordinated system performance of the to-be-added communication system in a case where no interference coordination is performed by the spectrum management device; and
    determine, based on the non-coordinated system performance, whether to agree to perform, by the spectrum management device, spectrum management on the to-be-added communication system.

20. A wireless communication method performed by a spectrum management device, comprising:
    performing, according to a predetermined interference coordination principle, coordination on interference between one or more base station devices in a to-be-added communication system and one or more base station devices in an existing communication system managed by the spectrum management device;

determining, based on a result of interference coordination, a coordinated system performance of the to-be-added communication system; and transmitting the coordinated system performance of the to-be-added communication system to an electronic device which manages the to-be-added communication system, for the electronic device to determine whether to agree to perform, by the spectrum management device, spectrum management on the to-be-added communication system.

* * * * *